US010872630B2

(12) United States Patent
Maeto et al.

(10) Patent No.: US 10,872,630 B2
(45) Date of Patent: Dec. 22, 2020

(54) TWO-DIMENSIONAL MAGNETIC RECORDING DEVICE CAPABLE OF POSITIONING THE HEAD BASED ON READING OF FIRST AND SECOND READERS

(71) Applicants: Kabushiki Kaisha Toshiba, Tokyo (JP); Toshiba Electronic Devices & Storage Corporation, Tokyo (JP)

(72) Inventors: Nobuhiro Maeto, Yokohama Kanagawa (JP); Takeyori Hara, Kawasaki Kanagawa (JP); Takayuki Kawabe, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/560,438

(22) Filed: Sep. 4, 2019

(65) Prior Publication Data

US 2020/0211588 A1 Jul. 2, 2020

(30) Foreign Application Priority Data

Dec. 27, 2018 (JP) ................. 2018-244893

(51) Int. Cl.
*G11B 5/596* (2006.01)
*G11B 5/027* (2006.01)
*G11B 5/54* (2006.01)
*G11B 15/02* (2006.01)

(52) U.S. Cl.
CPC ........ *G11B 5/59627* (2013.01); *G11B 5/0275* (2013.01); *G11B 5/54* (2013.01); *G11B 5/59633* (2013.01); *G11B 5/59638* (2013.01); *G11B 15/02* (2013.01)

(58) Field of Classification Search
None
See application file for complete search history.

(56) References Cited

U.S. PATENT DOCUMENTS

| 6,266,205 | B1 | 7/2001 | Schreck et al. | |
|---|---|---|---|---|
| 8,837,068 | B1* | 9/2014 | Liao .................. | G11B 5/59688 360/42 |
| 8,861,111 | B1* | 10/2014 | Liao ........................ | G11B 5/09 360/39 |
| 8,902,536 | B1* | 12/2014 | Hwang .............. | G11B 5/59627 360/75 |
| 8,953,276 | B1* | 2/2015 | Pokharel ................ | G11B 5/596 360/75 |
| 9,019,642 | B1* | 4/2015 | Xia .................. | G11B 20/10009 360/25 |
| 9,196,298 | B1* | 11/2015 | Zhang .................. | G11B 5/4813 |
| 9,583,131 | B1* | 2/2017 | Sugiyama .......... | G11B 5/59627 |

(Continued)

*Primary Examiner* — Tan X Dinh
(74) *Attorney, Agent, or Firm* — White & Case LLP

(57) ABSTRACT

According to one embodiment, a magnetic disk device includes a disk including a plurality of servo data items, a head including a write head which writes data to the disk, and a first read head and a second read head which read data from the disk, and a controller configured to position the head based on a first signal in which write data positioned between the servo data items of the disk is read by the first read head, and a second signal in which the write data is read by the second read head separated from the first read head in a radial direction of the disk.

13 Claims, 17 Drawing Sheets

(56) References Cited

U.S. PATENT DOCUMENTS

| | | | |
|---|---|---|---|
| 9,837,110 B1 | 12/2017 | Oberg et al. | |
| 10,360,930 B1* | 7/2019 | Asakura | G11B 5/59688 |
| 10,529,365 B2* | 1/2020 | Tagami | G11B 5/59627 |
| 10,529,376 B1* | 1/2020 | Oberg | G11B 5/59622 |
| 2004/0252399 A1 | 12/2004 | Maeda et al. | |
| 2014/0118857 A1* | 5/2014 | Kashiwagi | G11B 19/045 360/75 |
| 2014/0139940 A1* | 5/2014 | Ong | G11B 20/1217 360/39 |
| 2015/0022916 A1* | 1/2015 | Zou | G11B 5/455 360/31 |
| 2015/0243322 A1* | 8/2015 | Grundvig | G11B 5/59627 360/51 |
| 2015/0332719 A1* | 11/2015 | Mendonsa | G11B 5/59655 360/77.08 |
| 2015/0356988 A1* | 12/2015 | Pokharel | G11B 5/596 360/48 |
| 2016/0012842 A1* | 1/2016 | Nangare | G11B 20/10009 360/77.04 |
| 2018/0144764 A1* | 5/2018 | Trantham | G11B 5/4886 |
| 2019/0287560 A1* | 9/2019 | Tagami | G11B 5/59655 |

\* cited by examiner

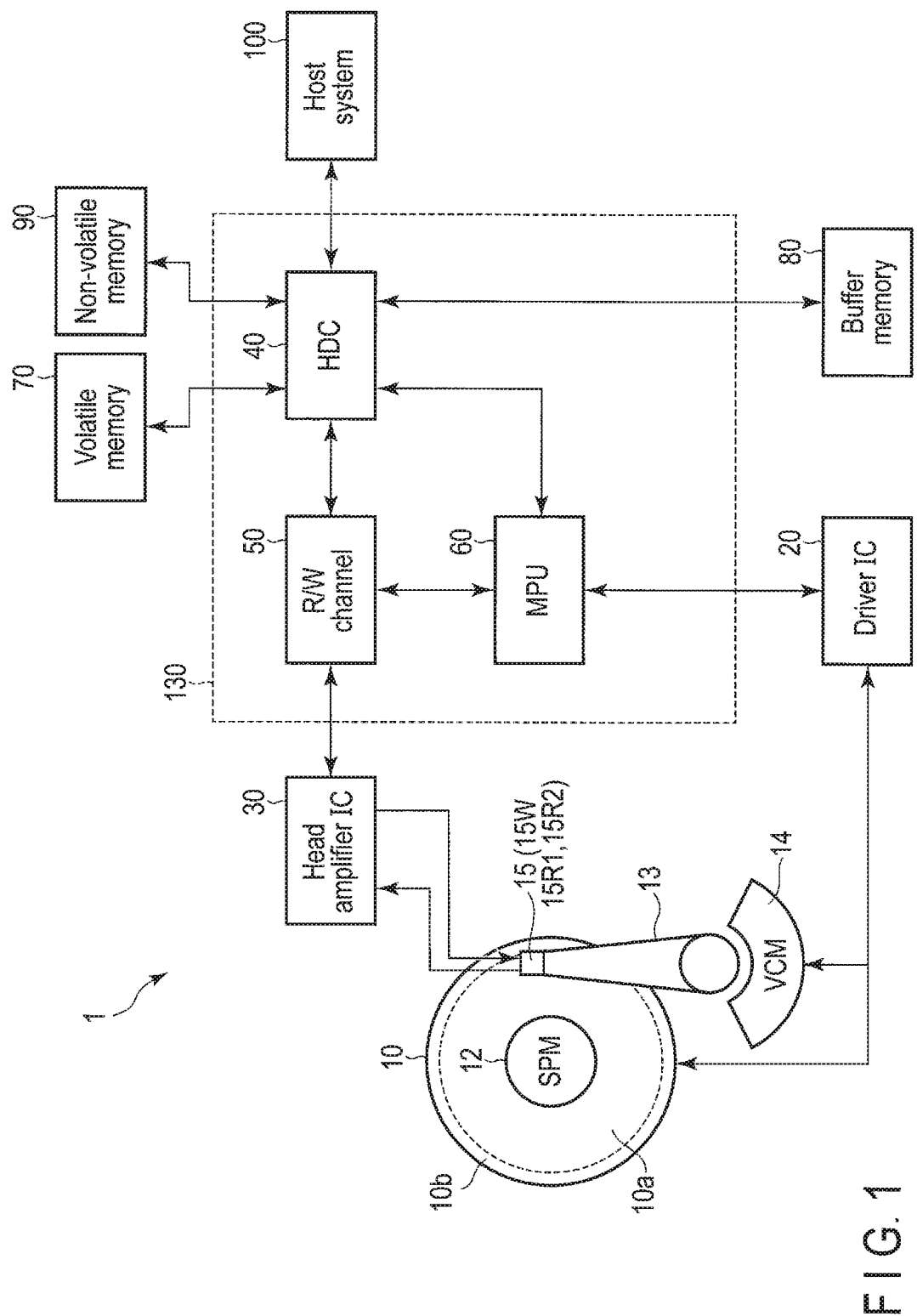
F I G. 1

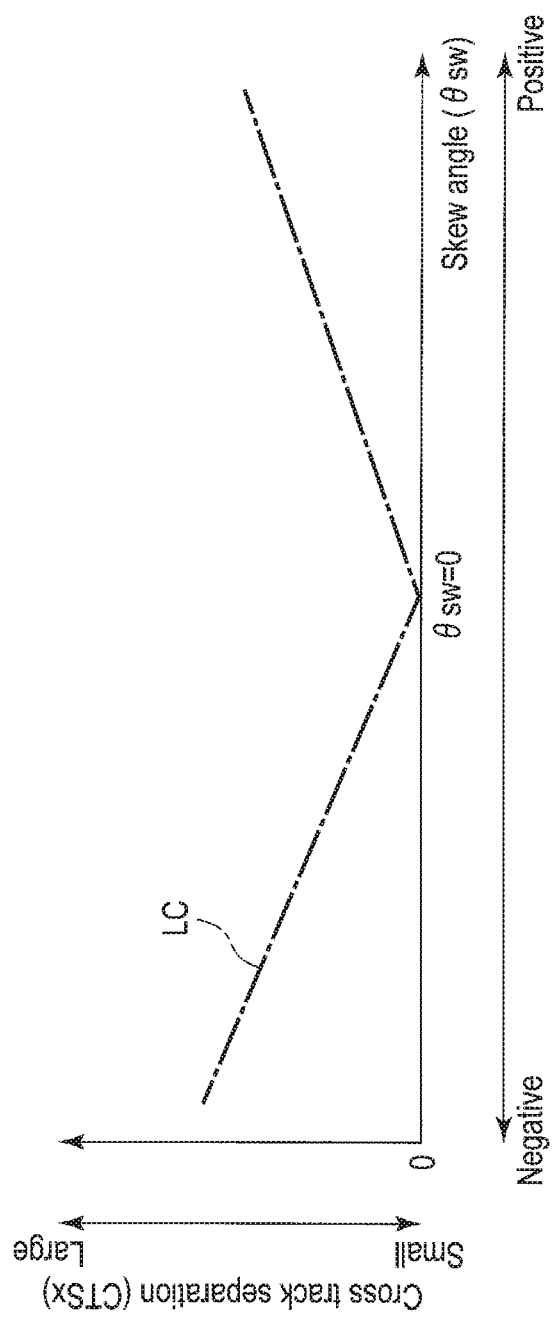
F I G. 5

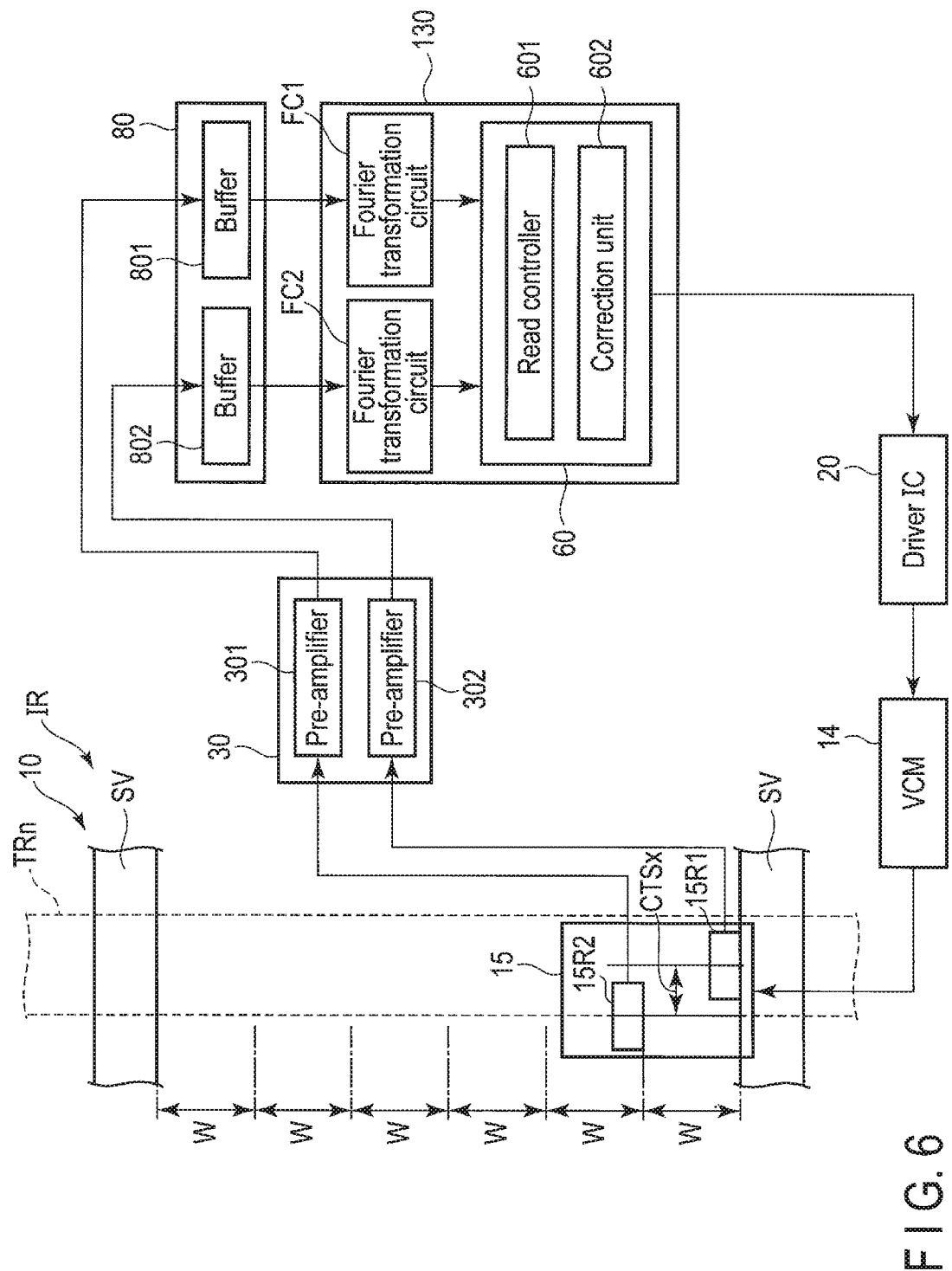
F I G. 6

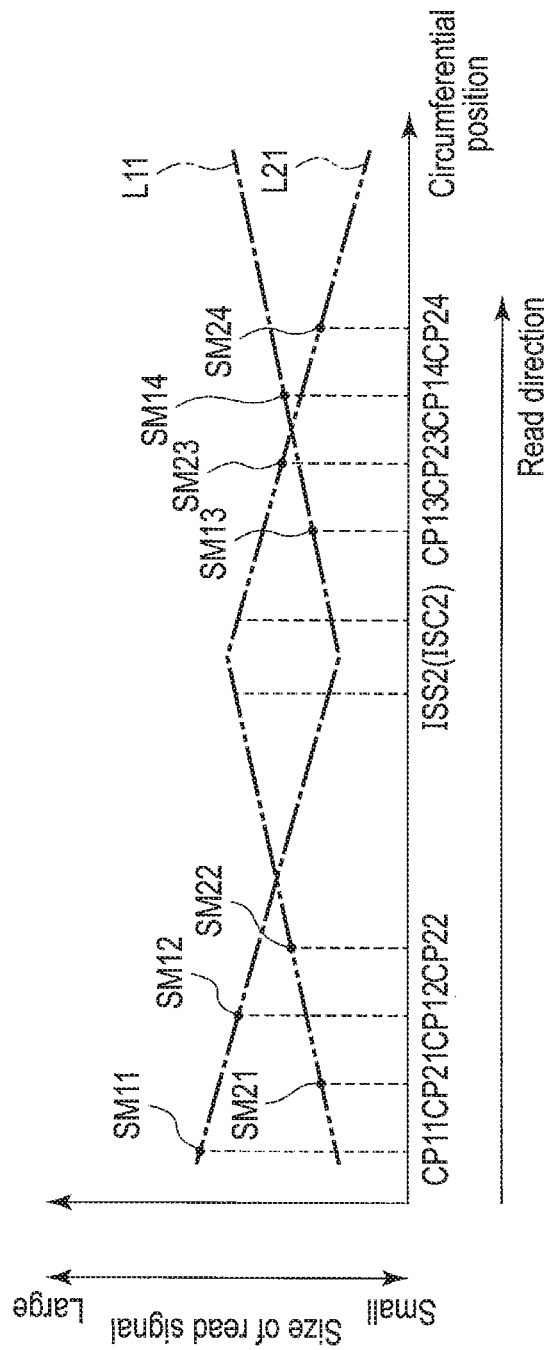
F I G. 8

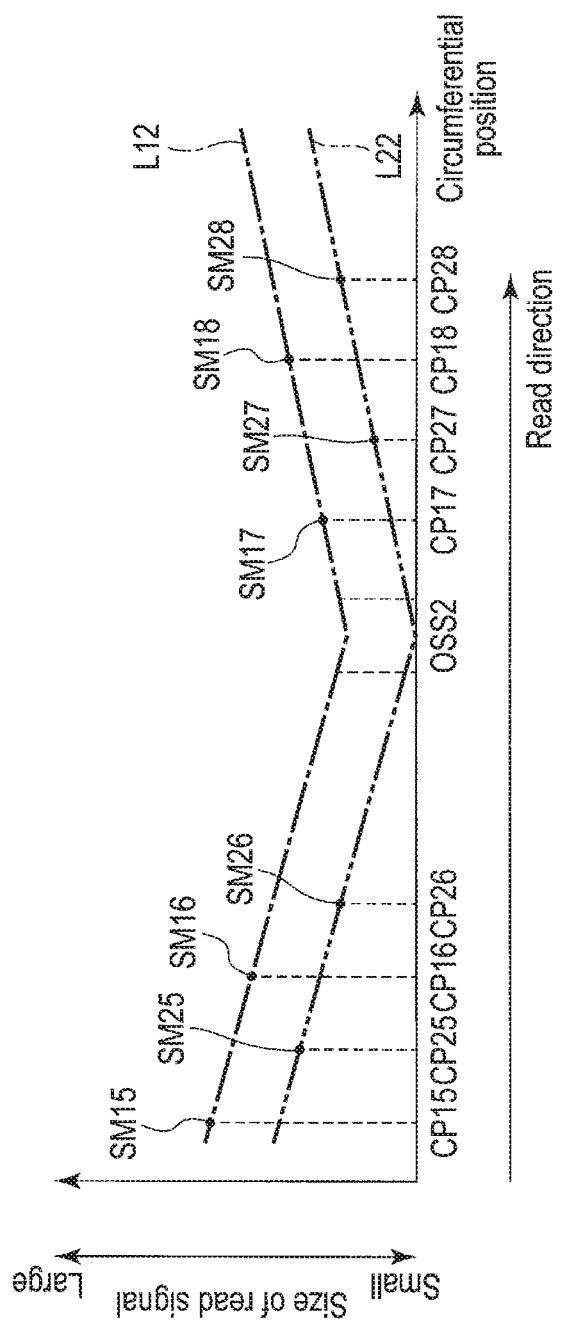
F I G. 10

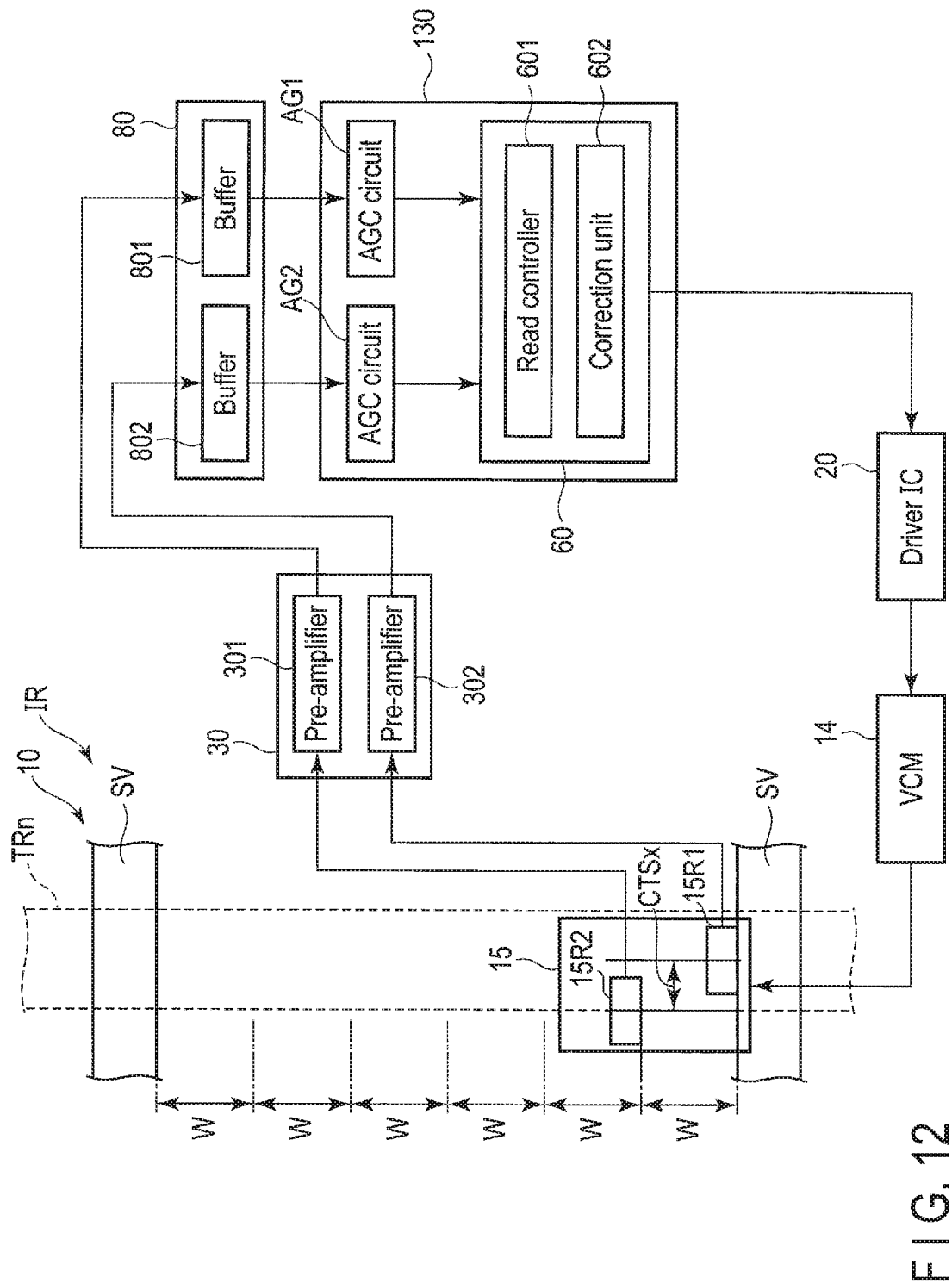
F I G. 12

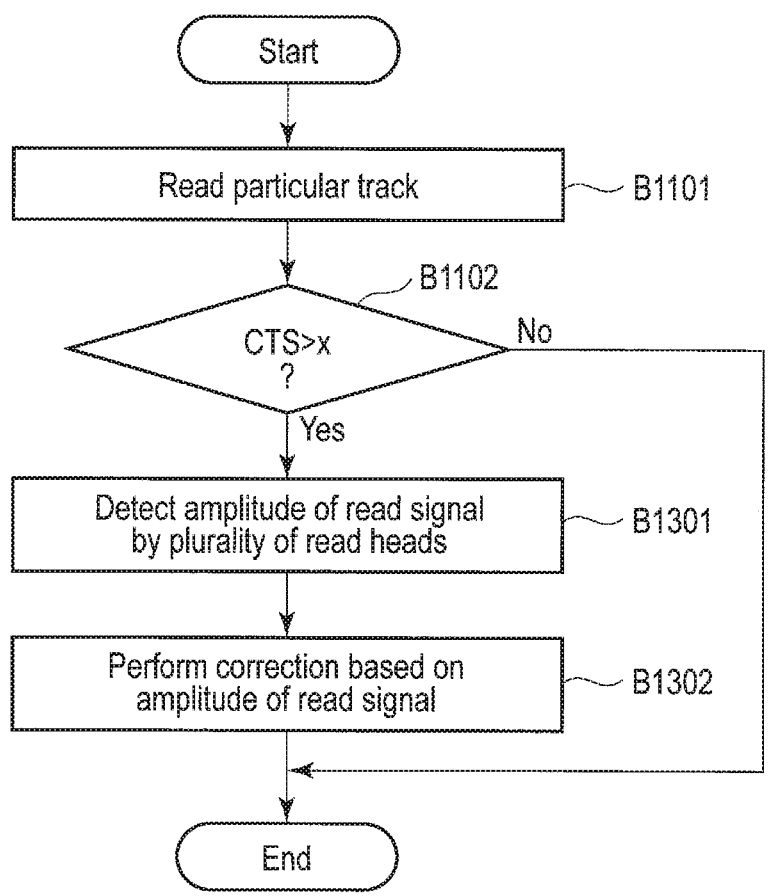
F I G. 13

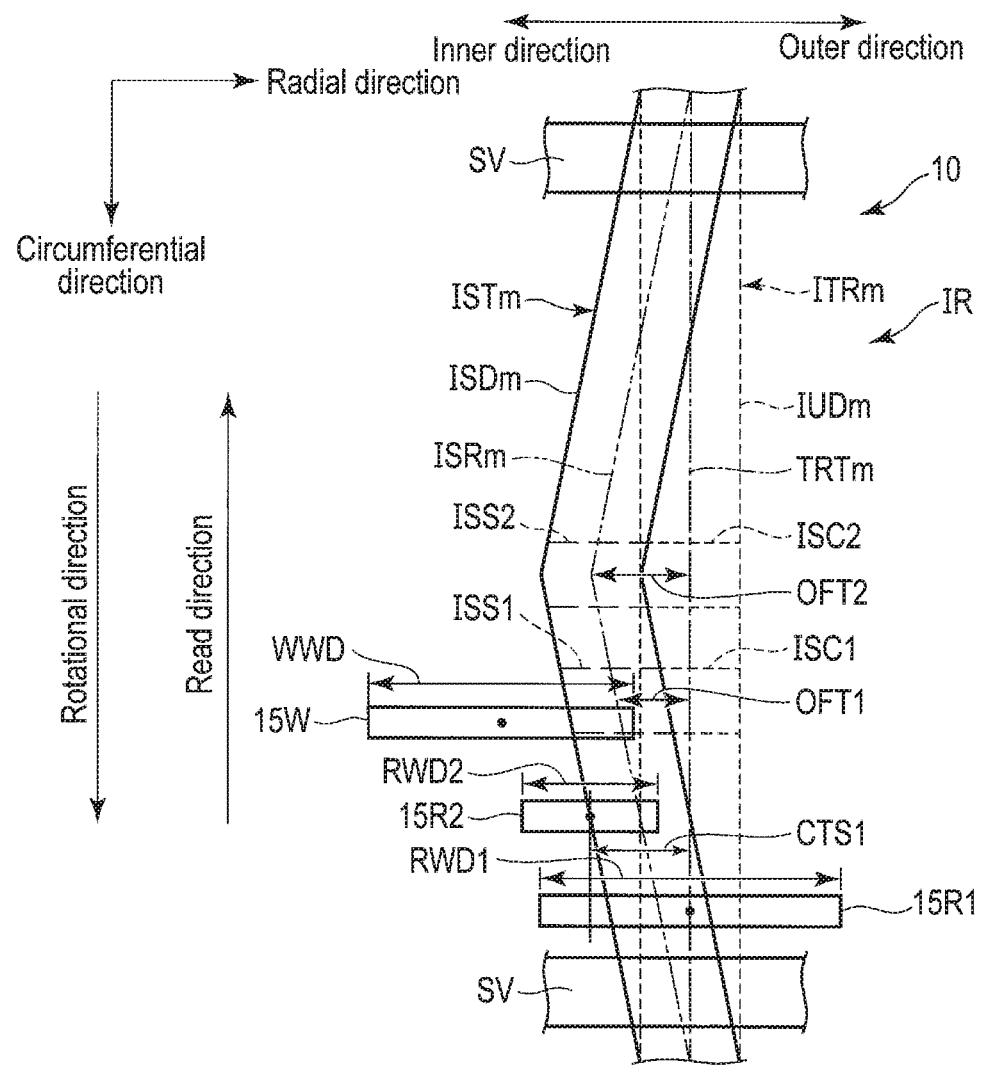
F I G. 14

TWO-DIMENSIONAL MAGNETIC RECORDING DEVICE CAPABLE OF POSITIONING THE HEAD BASED ON READING OF FIRST AND SECOND READERS

CROSS-REFERENCE TO RELATED APPLICATIONS

This application is based upon and claims the benefit of priority from Japanese Patent Application No. 2018-244893, filed Dec. 27, 2018, the entire contents of which are incorporated herein by reference.

FIELD

Embodiments described herein relate generally to a magnetic disk drive and a read processing method.

BACKGROUND

There is a possibility that a magnetic disk drive writes data in a position deviated from a target position in a radial direction of a disk according to non-linearity, mechanical properties, or the like of servo processing due to a vibration or the like from the outside. In this case, in the magnetic disk drive, data is read by positioning a read head in the target position, and thus, a signal to noise (SN) ratio (SNR) of a signal in which the data is read can be decreased. For this reason, a magnetic disk drive that is capable of reading and tracking the data written in a position deviated from the target position has been developed.

On the other hand, recently, a two-dimensional magnetic recording (TDMR) type magnetic disk drive including a plurality of read heads has been developed.

BRIEF DESCRIPTION OF THE DRAWINGS

FIG. 1 is a block diagram illustrating a configuration of a magnetic disk drive according to a first embodiment.

FIG. 5 is a diagram illustrating an example of a change in cross track separation with respect to a skew angle.

FIG. 6 is a block diagram illustrating a configuration example of a read system according to the first embodiment.

FIG. 8 is a diagram illustrating an example of a circumferential change in a size of a read signal in which user data illustrated in FIG. 7 is read by each of a plurality of read heads.

FIG. 10 is a diagram illustrating an example of a circumferential change in a size of a read signal in which user data illustrated in FIG. 9 is read by each of the plurality of read heads.

FIG. 12 is a block diagram illustrating a configuration example of a read system according to a second embodiment.

FIG. 13 is a flowchart illustrating an example of read processing according to the second embodiment.

FIG. 14 is a schematic view illustrating an example of read processing according to a third embodiment.

DETAILED DESCRIPTION

Figure 2:
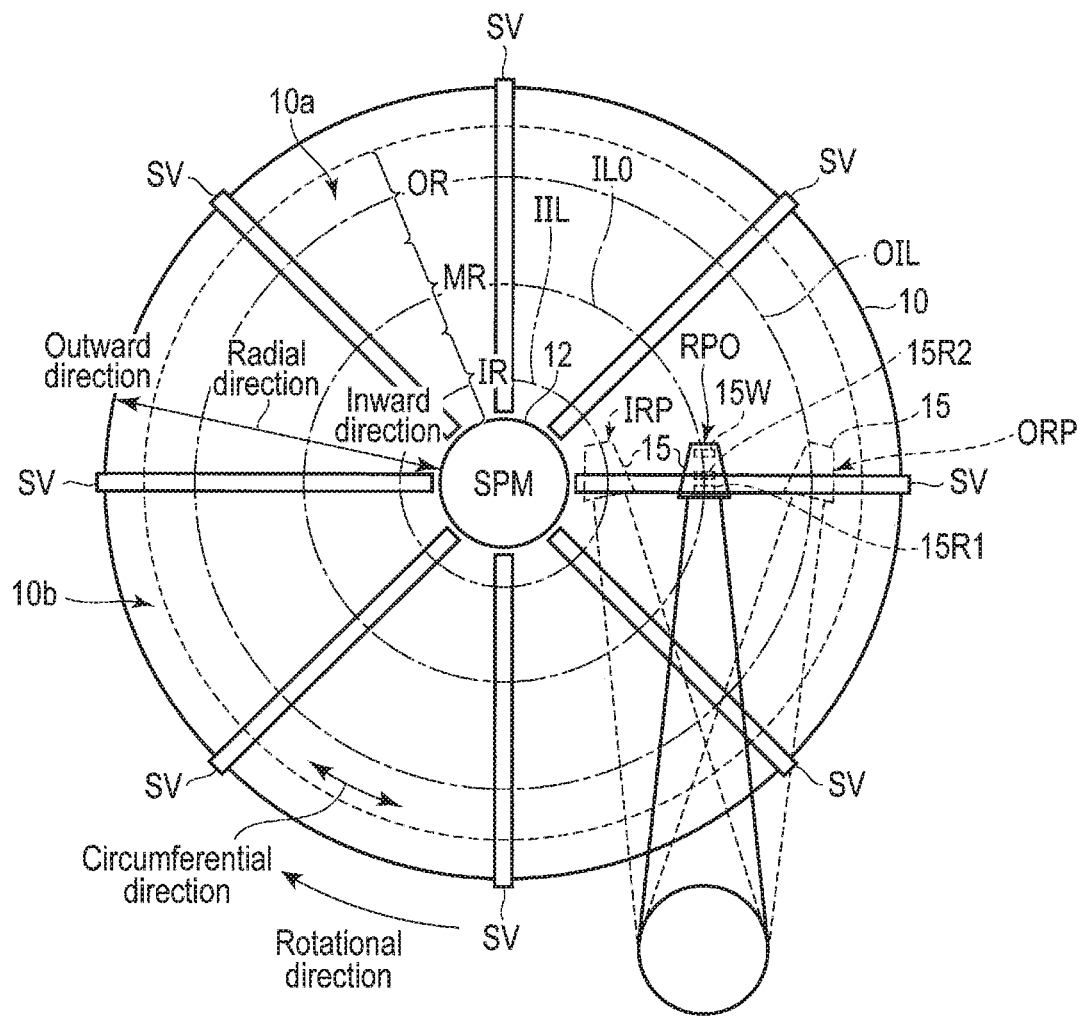
FIG. 2 is a schematic view illustrating an example of arrangement of a head with respect to a disk according to the first embodiment.

In general, according to one embodiment, a magnetic disk drive, comprises: a disk comprising a plurality of servo data items; a head comprising a write head which writes data to the disk, and a first read head and a second read head which read data from the disk; and a controller configured to position the head based on a first signal in which write data positioned between the servo data items of the disk is read by the first read head, and a second signal in which the write data is read by the second read head separated from the first read head in a radial direction of the disk.

Hereinafter, embodiments will be described with reference to the drawings. Furthermore, the drawings are an example, and do not limit the scope of the invention.

First Embodiment

FIG. 1 is a block diagram illustrating a configuration of a magnetic disk drive 1 according to a first embodiment.

The magnetic disk drive 1 includes a head disk assembly (HDA), a driver IC 20, a head amplifier integrated circuit (hereinafter, a head amplifier IC or a pre-amplifier) 30, a volatile memory 70, a buffer memory (a buffer) 80, a non-volatile memory 90, and a system controller 130 that is an integrated circuit of one chip, described below. In addition, the magnetic disk drive 1 is connected to a host system (a host) 100. The magnetic disk drive 1, for example, is a two-dimensional magnetic recording (TDMR) type magnetic disk drive.

The HDA includes a magnetic disk (hereinafter, referred to as a disk) 10, a spindle motor (SPM) 12, an arm 13 on which a head 15 is mounted, and a voice coil motor (VCM) 14. The disk 10 is attached to the spindle motor 12, and is rotated according to the driving of the spindle motor 12. The arm 13 and the VCM 14 configure an actuator. The actuator moves and controls the head 15 that is mounted on the arm 13 to a particular position of the disk 10, according to the driving of the VCM 14. Two or more disks 10 and heads 15 may be provided. Hereinafter, there is a case where data that is transferred from each unit of the magnetic disk drive 1 or an external device, for example, the host 100, and is written on the disk 10 referred to as write data, and data that is transferred to each unit of the magnetic disk drive 1 or the external device, for example, the host 100, and is read from the disk 10 is referred to as read data.

In a recording region of the disk 10, a user data region 10a that can be used by a user, and a system area 10b in which information necessary for system management is written are allocated. Hereinafter, a direction along the circumference of the disk 10, that is, a particular track of the disk 10 will be referred to as a circumferential direction, and a direction that intersects with the circumferential direction will be referred to as a radial direction. Hereinafter, a particular position of the disk 10 in the circumferential direction will be referred to as a circumferential position, and a particular position of the disk 10 in the radial direction will be referred to as a radial position. In addition, there is a case where data that is written on the track of the disk 10, a particular radial position of the disk 10, and a center position (hereinafter, referred to as a track center) of the width of a particular track of the disk 10 in the radial direction (hereinafter, simply referred to as a track width), a particular radial position in the track width of a particular track of the disk 10, or the like is simply referred to as a track.

The head 15 includes a slider that is provided as a main body, and a write head 15W and read heads 15R1 and 15R2 that are mounted on the slider. The write head 15W writes data on the disk 10. The read heads 15R1 and 15R2 read data that is recorded in the disk 10. The read head 15R1, for example, is provided in a position farthest from the write head 15W. The read head 15R2, for example, is provided in a position of the read head 15R1 next farthest from the write head 15W. In other words, the read head 15R2 is positioned between the write head 15W and the read head 15R1. Furthermore, three or more read heads may be provided. Hereinafter, it will be described that the magnetic disk drive 1 positions the head 15 based on the read head 15R1. Furthermore, the magnetic disk drive 1 may position the head 15 based on a read head other than the read head 15R1, for example, the read head 15R2. Hereinafter, there is a case where in the magnetic disk drive 1, a particular read head of a plurality of read heads that is a reference at the time of positioning the head 15 is referred to as a reference read head.

FIG. 2 is a schematic view illustrating an example of the arrangement of the head 15 with respect to the disk 10 according to the present embodiment. As illustrated in FIG. 2, a direction towards an outer circumference of the disk 10 in the radial direction will be referred to as an outer direction (the outside), and a direction opposite to the outer direction will be referred to as an inner direction (the inside). In addition, as illustrated in FIG. 2, in the circumferential direction, a direction in which the disk 10 is rotated will be referred to as a rotational direction. Furthermore, in the example illustrated in FIG. 2, the rotational direction is illustrated as a clockwise direction, but may be a reverse direction (a counterclockwise direction). In FIG. 2, the user data region 10a is partitioned into an inner circumference region IR that is positioned in the inner direction, an outer circumference region OR that is positioned in the outer direction, and an intermediate circumferential region MR that is positioned between the inner circumference region IR and the outer circumference region OR. In the example illustrated in FIG. 2, a radial position IRP, a radial position RP0, and a radial position ORP are illustrated. The radial position IRP is positioned in the inner direction from the radial position RP0, and the radial position ORP is positioned in the outer direction from the radial position RP0. In the example illustrated in FIG. 2, the radial position RP0 is in the intermediate circumferential region MR, the radial position ORP is in the outer circumference region OR, and the radial position IRP is in the inner circumference region IR. Furthermore, the radial position RP0 may be in the outer circumference region OR, or may be in the inner circumference region IR. The radial positions IRP and ORE may be respectively positioned in the intermediate circumferential region MR. In FIG. 2, the radial position IRP corresponds to a track center IIL of a particular track in the inner circumference region IR, the radial position RP0 corresponds to a track center IL0 of a particular track in the intermediate circumferential region MR, and the radial position ORP corresponds to a track center OIL of a particular track in the outer circumference region OR. The track center IIL corresponds to a particular track, for example, a locus or a path to be a target of the head 15 on a particular track in the inner circumference region IR (hereinafter, also referred to as a target locus or a target path). The track center IL0, particular track, for example, corresponds to a target path of the head 15 on a particular track in the intermediate circumferential region MR. The track center OIL corresponds to a particular track, for example, a target path of the head 15 on a particular track in the outer circumference region OR. For example, the track centers IIL, IL0, and OIL are respectively in the shape of a perfect circle. The track centers IIL, IL0, and OIL are concentrically arranged with respect to the disk 10. As described above, there is a case where the track centers IIL, IL0, and OIL that are concentrically arranged with respect to the disk 10 are referred to as a target track.

The disk 10 includes a plurality or servo patterns SV. Hereinafter, there is a case where the servo pattern SV is referred to as a servo sector or a servo region. The plurality of servo patterns SV radially extend in the radial direction of the disk 10, and are discretely arranged in the circumferential direction at particular separation. The servo pattern SV includes servo data for positioning the head 15 in a particular radial position of the disk 10, and the like. Hereinafter, there is a case where data other than the servo data that is written in the user data region other than the servo sector SV is referred to as user data.

The servo data, for example, includes a servo mark, address data, burst data, and the like. The address data includes the address of a particular track (a cylinder address), and the address of the servo sector of a particular track. The burst data is data that is used for detecting a position deviation (a position errors of the head 15 in the radial direction with respect to the track center of a particular track (relative position data), and includes a repeating pattern of a particular period. The burst data is written in zigzag across tracks adjacent to the outside.

In a case where the head 15 is positioned in the radial position RP0, a skew angle, for example, is 0°. Hereinafter, there is a case where the radial position RP0 is referred to as a reference position RP0. In a case where the head 15 is positioned in the radial position ORP, the skew angle, for example, is a positive value. In a case where the head 15 is positioned in the radial position IRP, the skew angle, for example, is a negative value. Furthermore, in a case where the head 15 is positioned in the radial position ORP, the skew angle may be a negative value. In addition, in a case where the head 15 is positioned in the radial position IRP, the skew angle may be a positive value.

Figure 3:
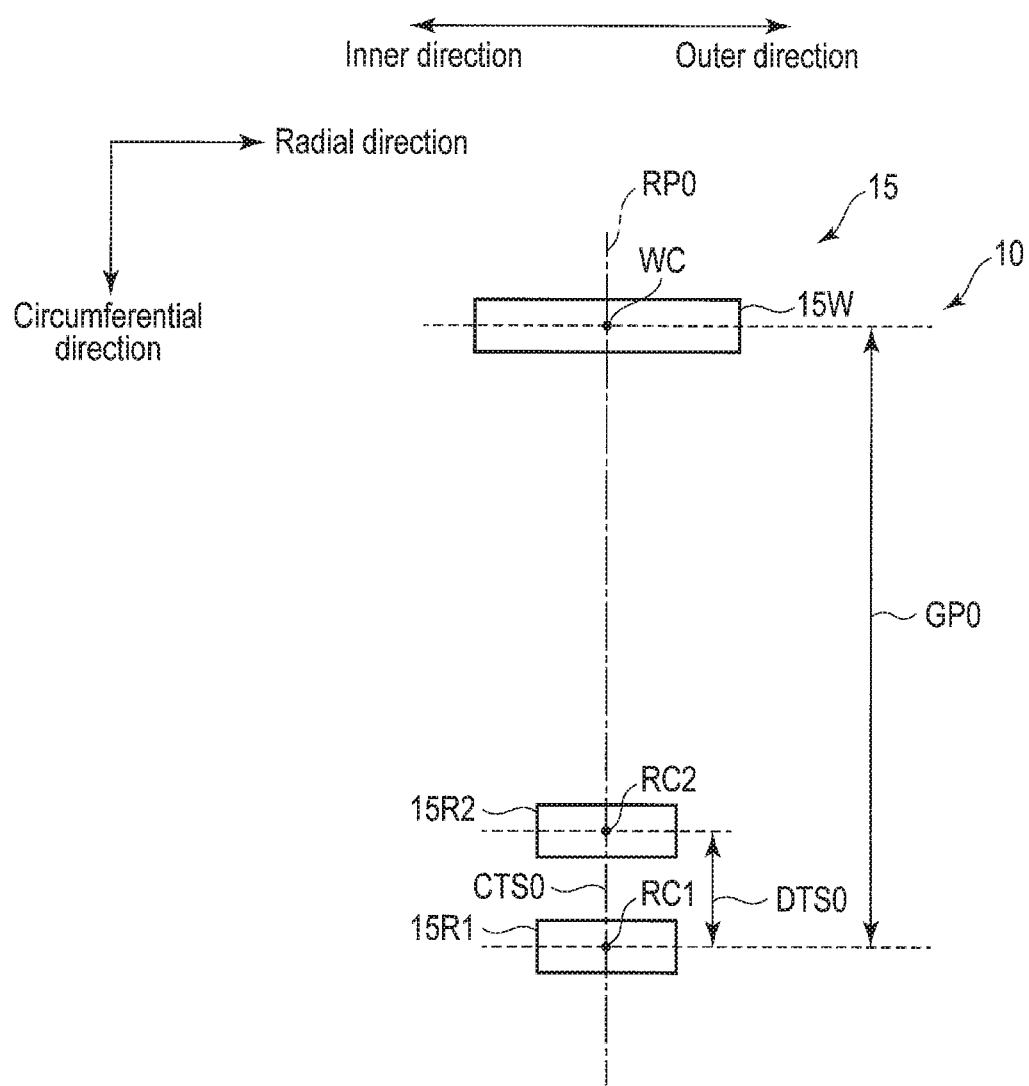
FIG. 3 is a schematic view illustrating an example of geometric arrangement of a write head and two read heads in a case where the read head is positioned in a reference position.

FIG. 3 is a schematic view illustrating an example of geometric arrangement of the write head 15W and the two read heads 15R1 and 15R2 in a case where the read head 15R1 is positioned in the reference position RP0. Hereinafter, the geometric arrangement of the write head 15W and the two read heads 15R1 and 15R2 in the head 15 will be described based on the position of the read head 15R1. In FIG. 3, a center portion WC of the write head 15W, a center portion RC1 of the read head 15R1, and a center portion RC2 of the read head 15R2 are illustrated. Hereinafter, there is a case where separation between the center portion RC1 of the read head 15R1 and the center portion RC2 of the read head 1532 in the circumferential direction is referred to as down track separation (DTS). In addition, there is a case where separation between the center portion RC1 of the read head 15R1 and the center portion RC2 of the read head 15R2 in the radial direction is referred to as cross track separation (CTS). Hereinafter, for convenience of description, there is a case where the "center portion of the write head" is simply referred to as a "write head", and the "center portion of the read head" is simply referred to as a "read head".

In the example illustrated in FIG. 3, in a case where the read head 15R1 is positioned in the reference position RP0, the write head 15W, the read head 15R1, and the read head 15R2 are arranged along the circumferential direction. In this case, the read head 15R1 and the read head 15R2 are not deviated in the radial direction. That is, cross track separation CTS0 in a case where the read head 15R1 is positioned in the reference position RP0 is 0. Furthermore, in a case where the read head 15R1 is positioned in the reference position RP0, the write head 15W and the read heads 15R1 and 15R2 may be deviated in the radial direction. In addition, in a case where the read head 15R1 is positioned in the reference position RP0, the read head 15R1 and the read head 15R2 may be deviated in the radial direction.

In the example illustrated in FIG. 3, in a case where the read head 15R1 is positioned in the reference position RP0, the write head 15W and the read head 15R1 are separated in the circumferential direction at separation GP0. In a case where the read head 15R1 is positioned in the reference position RP0, the read head 15R1 and the read head 15R2 are separated in the circumferential direction at the down track separation DTS0.

Figure 4:
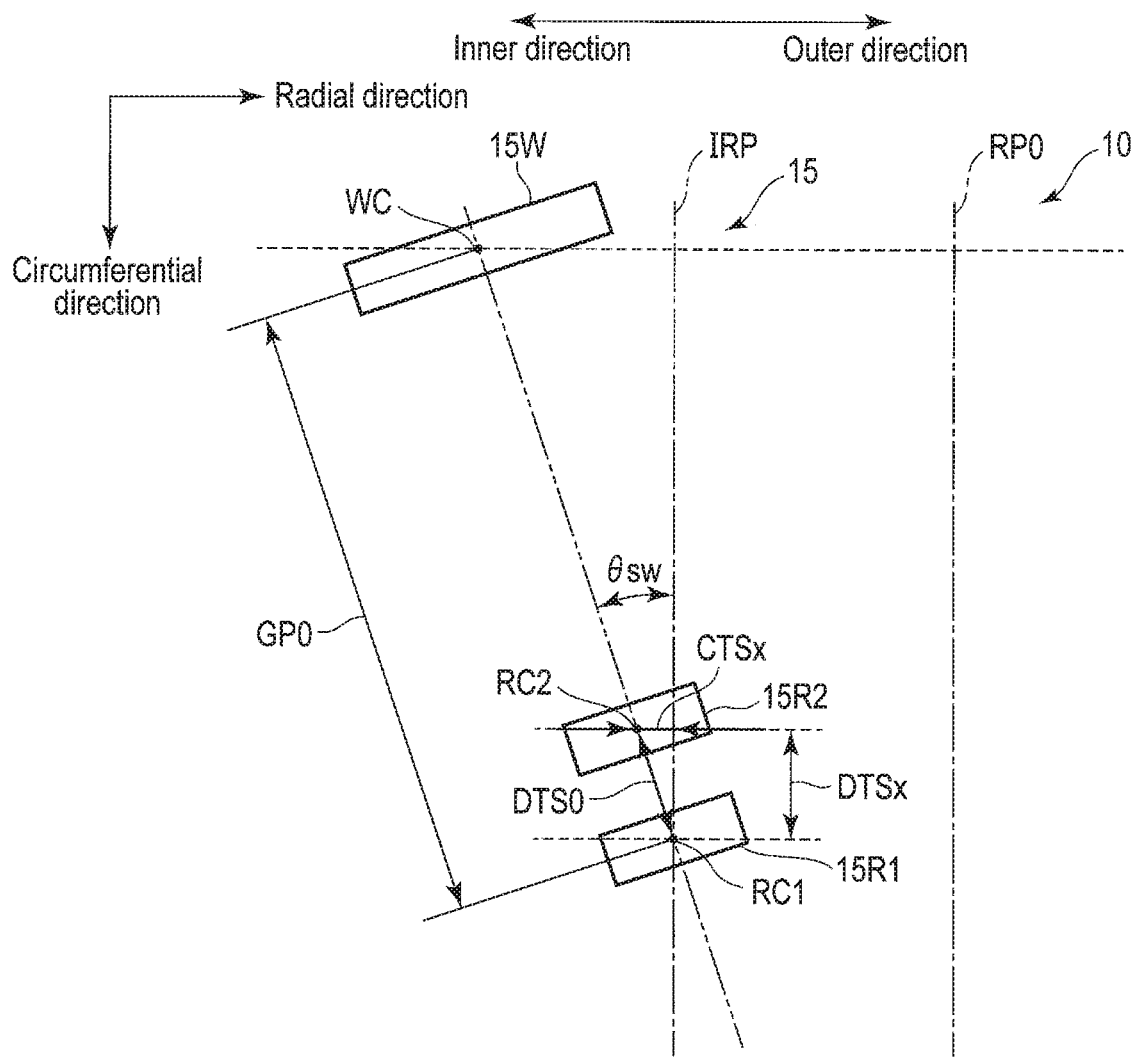
FIG. 4 is a diagram illustrating an example of geometric arrangement of the write head and the two read heads in a case where the read head is positioned in a radial position.

FIG. 4 is a diagram illustrating an example of the geometric arrangement of the write head 15W and the two read heads 15R1 and 15R2 in a case where the read head 15R1 is positioned in the radial position IRP.

In the example illustrated in FIG. 4, in a case where the read head 15R1 is positioned in the radial position IRP, the write head 15W, the read head 15R1, and the read head 15R2 are inclined in the inner direction at a skew angle θsw with respect to the circumferential direction. In this case, the read head 15R1 and the read head 15R2 are separated in the radial direction at cross track separation CTSx.

In the example illustrated in FIG. 4, in a case where the read head 15R1 is positioned in the radial position IRP, the read head 15R1 and the read head 15R2 are separated in the circumferential direction at down track separation DTSx.

Furthermore, as with a case where the read head 15R1 is positioned in the radial position IRP, in a case where the read head 15R1 is positioned in the radial position ORP, the write head 15W and the two read heads 15R1 and 15R2 are inclined in the outer direction at a particular skew angle θsw. In a case where the read head 15R1 is positioned in the radial position ORP, the read head 15R1 and the read head 15R2 can be separated in the circumferential direction at particular down track separation DTSx. In addition, in this case, the read head 15R1 and the read head 15R2 can be separated in the radial direction at particular cross track separation CTSx.

FIG. 5 is a diagram illustrating an example of a change in the cross track separation with respect to the skew angle. In FIG. 5, a horizontal axis represents the skew angle, for example, the skew angle θsw illustrated in FIG. 4, and a vertical axis represents the cross track separation in a case where the head 15 is inclined with respect to the circumferential direction at a particular skew angle, for example, at the skew angle θsw, for example, the cross track separation CTSx illustrated in FIG. 4. On the horizontal axis of FIG. 5, the skew angle (θsw) increases in a direction of a positive value as proceeding in a direction of a positive arrow from θsw=0 (an original point), and decreases in a direction of a negative value as proceeding in a direction of a negative arrow from θsw=0. In an example, the increase of the skew angle to the positive value corresponds to the inclination of the head 15 to the outer direction, and the decrease of the skew angle to the negative value corresponds to the inclination of the head 15 to the inner direction. On the vertical axis of FIG. 5, the cross track separation (CTSx) increases as proceeding in a direction of a large arrow, and decreases as proceeding in a direction of a small arrow. In FIG. 5, a change LC in the cross track separation (CTSx) with respect to the skew angle (θsw) is illustrated.

As illustrated by the change LC in the cross track separation of FIG. 5, in a case where the skew angle (θsw) is 0, the cross track separation (CTSx) is 0. In other words, in a case where the skew angle is 0, the read head 15R1 and the read head 15R2 are arranged along the circumferential direction. As illustrated by the change LC in the cross track separation of FIG. 5, the cross track separation (CTSx) increases as the skew angle (θsw) decreases in the direction of the negative value. In other words, in a case where the skew angle is the negative value, the read head 15R1 and the read head 15R2 are separated in the radial direction at the cross track separation (CTSx). As illustrated by the change LC in the cross track separation of FIG. 5, the cross track separation (CTSx) increases as the skew angle (θsw) increases in the direction of the positive value. In other words, in a case where the skew angle is the positive value, the read head 15R1 and the read head 15R2 are separated in the radial direction at the cross track separation (CTSx).

The driver IC 20 controls the driving of the SPM 12 and the VCM 14, according to the control of the system controller 130 (specifically, an MPU 60 described below).

The head amplifier IC (pre-amplifier) 30 includes a read amplifier and a write driver. The read amplifier amplifies a read signal that is read from the disk 10, and outputs the signal to the system controller 130 (specifically, a read/write (R/W) channel 50 described below). The write driver outputs a write current according to write data that is output from the R/W channel 50 to the head 15.

The volatile memory 70 is a semiconductor memory from which stored data is lost in a case where power supply is cut off. The volatile memory 70 stores data or the like necessary for processing in each unit of the magnetic disk drive 1. The volatile memory 70, for example, is a dynamic random access memory (DRAM) or a synchronous dynamic random access memory (SDRAM).

The buffer memory 80 is a semiconductor memory in which data or the like that is transmitted and received between the magnetic disk drive 1 and the host 100 is temporarily recorded. Furthermore, the buffer memory 80 may be integrated with the volatile memory 70. The buffer memory 80, for example, is a DRAM, a static random access memory (SRAM), an SDRAM, a ferroelectric random access memory (FeRAM), a magnetoresistive random access memory (MRAM), or the like.

The non-volatile memory 90 is a semiconductor memory in which data that is stored even in a case where power supply is cut off is recorded. The non-volatile memory 90, for example, is an NOR type or NAND type flash read only memory (ROM) (FROM).

The system controller (a controller) 130, for example, is realized by using a large-scale integrated circuit (LSI) that is referred to as a System-on-a-Chip (SoC) in which a plurality of elements are integrated in a single chip. The system controller 130 includes a hard disk controller (HDC) 40, the read/write (R/W) channel 50, and the microprocessor (MPU) 60. The MDC 40, the R/W channel 50, and the MPU 60 are electrically connected to each other. The system controller 130, for example, is electrically connected to the driver IC 20, the head amplifier IC 60, the volatile memory 70, the buffer memory 80, the non-volatile memory 90, the host system 100, and the like.

The MDC 40 controls data transfer between the host 100 and the R/W channel 50, according to an instruction from the MPU 60 described below. The MDC 40, for example, is electrically connected to the volatile memory 70, the buffer memory 80, the non-volatile memory 90, and the like.

The R/W channel 50 executes signal processing of the read data and the write data, according to an instruction from the MPU 60. The R/W channel 50 is provided with a circuit or a function that measures signal quality of the read data. The R/W channel 50, for example, is electrically connected to the head amplifier IC 30 and the like.

The MPU 60 is a main controller that controls each unit of the magnetic disk drive 1. The MPU 60 controls the VCM 14 through the driver IC 20, and executes positioning of the head 15. The MPU 60 controls a write operation of data with respect to the disk 10, and selects a storage destination of the write data that is transferred from the host 100. In addition, the MPU 60 controls a read operation of data from the disk 10, and controls processing of the read data that is transferred to the disk 10 to the host 100. The MPU 60 is connected to each unit of the magnetic disk drive 1. The MPU 60, for example, is electrically connected to the driver IC 20, the MDC 40, the R/W channel 50, and the like.

Hereinafter, in the VCM 14, the head 15, the head amplifier IC 30, the buffer memory 80, the system controller 130, and the like, a system that executes read processing will be referred to as a read system.

FIG. 6 is a block diagram illustrating a configuration example of the read system according to the present embodiment. In FIG. 6, a particular region of the disk 10, for example, a track TRn that is written in the inner circumference region IR, and the head 15 in a case where the read head 15R1 is positioned on the track TRn are illustrated. In FIG. 6, the read head 15R1 and the read head 15R2 are separated in the radial direction at the cross track separation CTSx. In addition, in FIG. 6, a partition W of the track (data) TRn read by each of the read heads 15R1 and 15R2 is illustrated. There is a case where the partition W, for example, is referred to as Window.

The head amplifier IC 30 includes a pre-amplifier 301 and pre-amplifier 302, as the read system. For example, the pre-amplifier 301 amplifies a signal in which user data of the track TRn is read for each of the partitions W by the read head 15R1, and outputs the signal. For example, the pre-amplifier 302 amplifies a signal in which the user data of the track TRn is read for each of the partitions W by the read head 15R2 that is separated from the read head 15R1 in the inner direction at the cross track separation CTSx, and outputs the signal. Furthermore, in a case where the head 15 includes three of more read heads, the head amplifier IC 30 may include three or more pre-amplifiers respectively corresponding to the read heads.

The buffer memory 80 includes a buffer 801 and a buffer 802, as the read system. For example, the buffer 801 holds data that is input from the pre-amplifier 301 for each of the partitions W. For example, the buffer 802 holds data that is input from the pre-amplifier 302 for each of the partitions W. Furthermore, in a case where the head 15 includes three or more read heads, the buffer memory 80 may include three or more buffers respectively corresponding to the read heads. In addition, the buffers 801 and 802 may be provided in the system controller 130.

The system controller 130 includes a signal processing circuit, for example, a Fourier transformation circuit FC1, a signal processing circuit, for example, a Fourier transformation circuit FC2, and the MPU 60, as the read system. For example, the Fourier transformation circuit FC1 performs Fourier transformation with respect to the data for each of the partitions W that is acquired from the buffer 801, and outputs the data that is subjected to the Fourier transformation to the MPU 60. For example, the Fourier transformation circuit FC2 performs Fourier transformation with respect to the data for each of the partitions W that is acquired from the buffer 802, and outputs the data that is subjected to the Fourier transformation to the MPU 60.

The MPU 60 includes a read controller 601 and a correction unit 602, as the read system.

The read controller 601 controls the VCM 14 through the driver IC 20, positions the head 15 in a particular position of the disk 10, and reads data. For example, the read controller 601 controls the VCM 14 through the driver IC 20, positions the reference read head in a particular track of the disk 10, and reads the particular track.

The correction unit 602 corrects the position of the head 15 based on signals in which a particular track is read by each of the plurality of read heads (hereinafter, may also be referred to as a read signal). For example, the correction unit 602 detects the size of the plurality of read signals in which the user data of a particular track is read by each of the read head 15R1 and 15R2 from the data that is input from Fourier transformation circuits FC1 and FC2, for example, a magnitude or signal power. The correction unit 602 corrects the position of the reference read head, for example, the read head 15R1 to track the track center of the track, based on the size of the read signal in which the user data of a particular track is read by the read head 15R1, and the size of the read signal in which the user data of the track is read by the read head 15R2 that is separated from the read head 15R1 in the radial direction at particular cross track separation.

In an example, the correction unit 602 corrects the position of the read head 15R1 such that the size of the read signal in which the user data is read by the read head 15R1 is a desired value, based on the size of the read signal in which the user data of a particular track is read by the read head 15R1, and the size of the read signal in which the user data of the particular track is read by the read head 15R2 that is separated from the read head 15R1 in the inner direction at the cross track separation CTSx. For example, the correction unit 602 corrects the position of the read head 15R1 such that the value of the read signal in which the user data is read by the read head 15R1 increases, based on the size of the read signal in which the user data of a particular track is read by the read head 15R1, and the size of the read signal in which the user data of the particular track is read by the read head 15R2 that is separated from the read head 15R1 in the inner direction at the cross track separation CTSx.

In other words, the correction unit 602 corrects the position of the read head 15R1 such that a signal to noise (SN) ratio (SNR) of the read signal in which the user data is read by the reference read head, for example, the read head 15R1 is a desired value, based on the size of the read signal in which the user data of a particular track is read by the read head 15R1, and the size of the read signal in which the user data of the particular track is read by the read head 15R2 that is separated from the read head 15R1 in the inner direction at the cross track separation CTSx. For example, the correction unit 602 corrects the position of the read head 15R1 such that the SN ratio of the read signal in which the user data is read by the read head 15R1 increases, based on the size of the read signal in which the user data of a particular track is read by the read head 15R1, and the size of the read signal in which the user data of the particular track is read by the read head 15R2 that is separated from the read head 15R1 in the inner direction at the cross track separation CTSx. The SN ratio of the read signal corresponds to the size of the read signal. For example, in a case where the SN ratio of the read signal increases, the size of the read signal also increases. In addition, in a case where the SN ratio of the read signal decreases, the size of the read signal also decreases.

Furthermore, in a case where the read heads 15R1 and 15R2 are arranged in the circumferential direction, that is, the cross track separation (CTS) of the read head 15R1 and the read head 15R2 in the radial direction is 0, the correction unit 602 may not correct the position of the head 15, for example, the read head 15R1 that is the reference read head. In other words, in a case where the reference read head, for example, the read head 15R1 is positioned in the radial position in which the skew angle is 0, the correction unit 602 does not correct the position of the head 15, for example, the read head 15R1. The correction unit 602 may not correct the head 15, for example, the read head 15R1 that is the reference read head, in the region of the disk 10 in which the cross track separation is 0 to a particular value. In other words, the correction unit 602 may not correct the head 15, for example, the read head 15R1 that is the reference read head, in the region of the disk 10 in which the skew angle is 0 to a particular value. In addition, the correction unit 602 may adjust the amount of correcting the head 15, for example, the read head 15R1 that is the reference read head in the radial direction, in a particular track, according to the size of the read signal in which the user data of the particular track is read by the read head 15R1, and the size of the read signal in which the user data of the particular track is read by the read head 15R2 that is separated from the read head 15R1 in the radial direction at the cross track separation.

Figure 7:
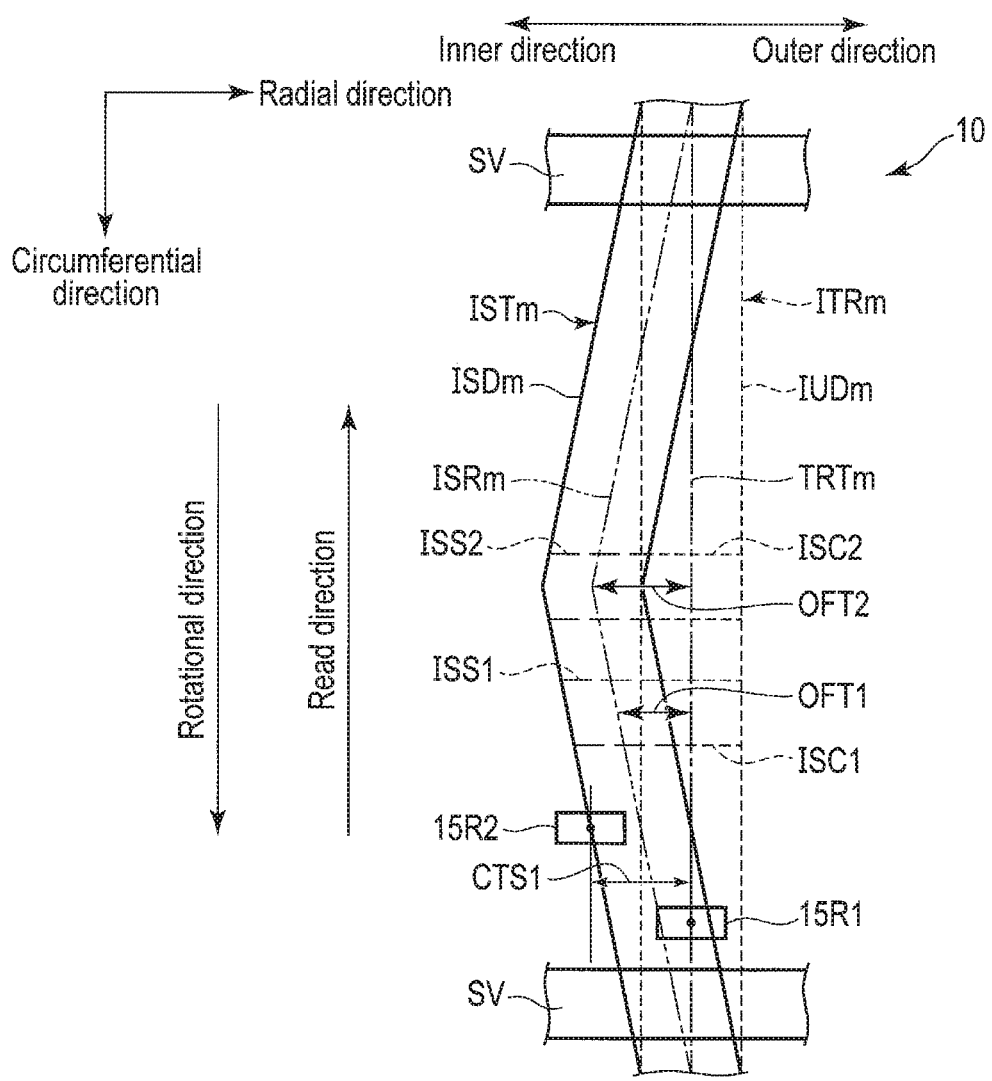
FIG. 7 is a schematic view illustrating an example of read processing according to the first embodiment.

FIG. 7 is a schematic view illustrating an example of the read processing according to the present embodiment. As illustrated in FIG. 7, a direction in which data is read in the circumferential direction will be referred to as a read direction. In the example illustrated in FIG. 7, the read direction is a direction opposite to the rotational direction in the circumferential direction. Furthermore, the read direction may be a direction identical to the rotational direction, in the circumferential direction.

FIG. 7 illustrates that the read head 15R1 is positioned in a target radial position (hereinafter, referred to as a target position) in the inner circumference region IR, and an ideal track (hereinafter, referred to as a target track) ITRm is concentrically written with respect to the disk 10 by the write head 15W along a target path TRTm. The target path TRTm corresponds to the track center of the target track ITRm. FIG. 7 illustrates user data IUDm of the target track ITRm positioned between two continuous servo sectors SV. In addition, FIG. 7 illustrates a track (hereinafter, referred to as an actual track) ISTm that is written on the disk 10 by the write head 15W along an actual path (hereinafter, referred to as an actual path) ISRm by positioning the read head 15R1 in the target position in the inner circumference region IR.

The actual path ISRm corresponds to track center of the actual track ISTm. FIG. 7 illustrates user data ISDm of the actual track ISTm that is positioned between two continuous servo sectors SV. The actual track ISTm is deviated with respect to the target track ITRm in the inner direction. The read head 15R2 is separated from the read head 15R1 in the inner direction at the cross track separation CTS1. FIG. 7 illustrates a sector ISC2 of the target track ITRm, and a sector ISC2 of the target track ITRm that is positioned in the read direction with respect to the sector ISC1. FIG. 7 illustrates a sector ISS1 of the actual track ISTm, and a sector ISS2 of the actual track ISTm that is positioned in the read direction from the sector ISS1. The sector ISS1 corresponds to a sector in which the sector ISC1 that is deviated in the inner direction by a deviation amount (hereinafter, referred to as an off-track amount) OFT1. The sector ISS2 corresponds to a sector in which the sector ISC2 is deviated in the inner direction by an off-track amount OFT2. The sector ISS2 is a sector that is most deviated in the radial direction with respect to the user data IUDm, in the user data ISDm.

In the example illustrated in FIG. 7, when the target track ITRm is written on the disk 10 by the write head 15W along the target path TRTm, in the inner circumference region IR, the write head 15W is deviated in the inner direction according to non-linearity, mechanical properties, or the like of servo processing due to a vibration or the like from the outside, and thus, the MPU 60 writes the actual track ISTm along the actual path ISRm that is deviated from the target, path TRTm in the inner direction.

In the example illustrated in FIG. 7, the MPU 60 positions the read head 15R1 on the target track ITRm, tracks the target path TRTm by the read head 15R1, and reads the user data ISDm of the actual track ISTm by the read heads 15R1 and 15R2. The MPU 60 corrects the radial position of the read head 15R1 with each of the circumferential positions in the read direction to track the actual path ISRm, based on the read signal in which the user data ISDm is read by the read head 15R1, and the read signal in which the user data ISDm is read by the read head 15R2. In other words, the MPU 60 corrects the radial position of the read head 15R1 with each of the circumferential positions in the read direction such that the SN ratio of the read signal in which the user data ISDm is read by the read head 15R1 increases, based on the read signal in which the user data ISDm is, read by the read head 15R1, and read signal in which the user data ISDm is read by the read head 15R2. For example, the MPU 60 shifts the radial position of the read head 15R1 in the inner direction to read the sector ISS1 and the sector ISS2, based on the read signal in which the user data. ISDm is read by the read head 15R1, and the read signal in which the user data ISDm is read by the read head 15R2. In other words, the MPU 60 shifts the radial position of the read head 15R1 in a direction from the read head 15R1 towards the read head 15R2 to read the sector ISS1 and the sector ISS2, based on the read signal in which the user data ISDm is read by the read head 15R1, and the read signal in which the user data ISDm is read by the read head 15R2.

Furthermore, in a case where the head 15 is positioned based on the read head 15R2, the MPU 60 may track the target path TRTm by the read head 15R2, and may read the actual track ISTm by the read heads 15R1 and 15R2. In this case, the MPU 60 corrects the radial position of the read head 15R2 with each of the circumferential positions in the read direction to track the actual path ISRm, based on the read signal in which the actual track ISTm is read by the read head 15R1, and the read signal in which the actual track ISTm is read by the read head 15R2. In other words, the MPU 60 corrects the radial position of the read head 15R2 with each of the circumferential positions in the read direction such that the SN ratio of the read signal in which the actual track ISTm is read by the read head 15R2 increases, based on the read signal in which the actual track ISTm is read by the read head 15R1, and the read signal in which the actual track ISTm is read by the read head 15R2.

In addition, in a case where the head 15 is positioned based on an intermediate portion between the read heads 15R1 and 15R2, the MPU 60 may track the target path TRTm by the intermediate portion between the read head 15R1 and the read head 15R2, and may read the actual track ISTm by the read heads 15R1 and 15R2. In this case, the MPU 60 corrects the radial position in the intermediate portion between the read heads 15R1 and 15R2 with each of the circumferential positions in the read direction to track the actual path. ISRm, based on the read signal in which the actual track ISTm is read by the read head 15R1, and the read signal in which the actual track ISTm is read by the read head 15R2. In other words, the MPU 60 corrects the radial position in the intermediate portion between the read heads 15R1 and 15R2 with each of the circumferential positions in the read direction such that the SN ratio of the plurality of read signals in which the actual track ISTm is read by each of the read heads 15R1 and 15R2 increases, based on the read signal in which the actual track ISTm is read by the read head 15R1, and the read signal in which the actual track ISTm is read by the read head 15R2.

FIG. 8 is a diagram illustrating an example of a circumferential change in the size of the read signal in which the user data ISDm illustrated in FIG. 7 is read by each of the plurality of read heads 15R1 and 15R2. In FIG. 8, a horizontal axis represents the circumferential position in the user data ISDm illustrated in FIG. 7, and a vertical axis represents the size of the read signal in which the user data ISDm is read by the read heads 15R1 and 15R2. On the horizontal axis of FIG. 8, the circumferential position proceeds in the read direction as proceeding in a direction of an arrow of the circumferential position. On the vertical axis of FIG. 8, the size of the read signal increases as proceeding in a direction of a large arrow, and decreases as proceeding in a direction of a small arrow. FIG. 8 illustrates a change L11 in the size of the read signal with respect to the circumferential position in a case where the target path TRTm is tracked by the read head 15R1, and the user data ISDm is read by the read head 15R1, and a change L21 in the size of the read signal with respect to the circumferential position in a case where the target path TRTm is tracked by the read head 15R1, and the user data ISDm is read by the read head 15R2. The change L11 in the size of the read signal decreases towards the circumferential position (hereinafter, simply referred to as a sector ISS2) corresponding to the sector ISS2 (ISC2) in the read direction, and increases in the read direction from the sector ISS2. The change L21 in the size of the read signal increases towards the sector ISS2, and decreases in the read direction from the sector ISS2. The change L11 in the size of the read signal of FIG. 8 represents a size SM11 of a read signal in a circumferential position CR11, a size SM12 of a read signal in a circumferential position CP12, a size SM13 of a read signal in a circumferential position CP13, and a size SM14 of a read signal in a circumferential position CP14. The circumferential position CP12 is a position in the read direction from the circumferential position CP11 and in a direction opposite to the read direction from the sector ISS2. The circumferential position CP13 is a position in the read direction from the sector ISS2 and in a direction opposite to the read direction from the circumferential position CP14. The size SM11 of the read signal is larger than the size SM12 of the read signal. The size SM13 of the read signal may be larger than or equal to the size SM12 of the read signal, or may be smaller than the size SM12 of the read signal. The size SM14 of the read signal is larger than the size SM13 of the read signal. The change L21 in the size of the read signal of FIG. 8 represents a size SM21 of a read signal in a circumferential position CP21, a size SM22 of a read signal in a circumferential position CP22, a size SM23 of a read signal in a circumferential position CP23, and a size SM24 of a read signal in a circumferential position CP24. The circumferential position CP22 is a position in the read direction from the circumferential position CP21 and in a direction opposite to the read direction from the sector ISS2. The circumferential position CP23 is a position in the read direction from the sector ISS2 and in a direction opposite to the read direction from the circumferential position CP24. The size SM22 of the read signal is larger than the size SM21 of the read signal. The size SM23 of the read signal may be larger than or equal to the size SM22 of the read signal, or may be smaller than the size SM22 of the read signal. The size SM23 of the read signal is larger than the size SM24 of the read signal. Furthermore, the circumferential positions CP11 and CP21 may be coincident with each other, or the circumferential positions CP12 and CP22 may be coincident with each other. In addition, the circumferential positions CP13 and CP23 may be coincident with each other, or the circumferential positions CP14 and CP24 may be coincident with each other.

In the example illustrated in FIG. 8, the MPU 60 reads the user data ISDm of the actual track ISTm by the read heads 15R1 and 15R2, as illustrated in FIG. 7. The MPU 60 performs Fourier transformation with respect to the user data ISDm that is read by the read head 15R1, and detects the size of the read signal in which the user data ISDm is read by the read head 15R1. For example, the MPU 60 detects that the size of the read signal of the read head 15R1 decreases as proceeding in the read direction from the size SM11 of the read signal in which the user data ISDm corresponding to the circumferential position CP11 is read by the read head 15R1, and the size SM12 of the read signal in which the user data ISDm corresponding to the circumferential position CP12 is read by the read head 15R1. The MPU 60 detects that the size of the read signal of the read head 15R2 increases as proceeding in the read direction from the size SM21 of the read signal in which the user data ISDm corresponding to the circumferential position CP21 is read by the read head 15R2, and the size SM22 of the read signal in which the user data ISDm corresponding to the circumferential position CP22 is read by the read head 15R2. The MPU 60 determines that the user data ISDm is in a direction separated from the user data IUDm in the inner direction as illustrated in FIG. 7, from the fact that the size of the read signal of the read head 15R1 decreases, and the size of the read signal of the read head 1582 increases. In a case where it is determined that the user data ISDm is in the direction separated from the user data IUDm in the inner direction, the MPU 60 shifts and corrects the read head 15R1 in the inner direction. In other words, in a case where it is detected that the size of the read signal of the read head 15R1 decreases, and the size of the read signal of the read head 15R2 increases when the read head 15R2 is positioned in the inner direction at the cross track separation from the read head 15R1, the MPU 60 corrects the read head 15R1 to be gradually deviated in a direction from the read head 15R1 towards the read head 15R2 in the radial direction along the read direction.

For example, the MPU 60 detects that the size of the read signal of the read head 15R1 increases as proceeding in the read direction from the size SM13 of the read signal in which the user data ISDm corresponding to the circumferential position CP13 is read by the read head 15R1, and the size SM14 of the read signal in which the user data ISDm corresponding to the circumferential position CP14 is read by the read head 15R1. The MPU 60 detects that the size of the read signal of the read head 15R2 decreases as proceeding in the read direction from the size SM23 of the read signal in which the user data ISDm corresponding to the circumferential position CP23 is read by the read head 15R2, and the size SM24 of the read signal in which the user data ISDm corresponding to the circumferential position CP24 is read by the read head 15R2. The MPU 60 determines that the user data ISDm is in the outer direction from a position that is separated from the user data IUDm in the inner direction, as illustrated in FIG. 7, from the fact that the size of the read signal of the read head 15R1 increases, and the size of the read signal of the read head 15R2 decreases. In a case where it is determined that the user data. ISDm is in the outer direction from the position that is separated from the user data IUDm in the inner direction, the MPU 60 corrects the read head 15R1 to be in the outer direction from a position that is deviated in the inner direction in other words, in a case where it is detected that the size of the read signal of the read head 15R1 increases, and the size of the read signal of the read head 15R2 decreases when the read head 15R2 is positioned in the inner direction at the cross track separation from the read head 15R1, the MPU 60 corrects the read head 15R1 to be gradually deviated in a direction from the read head 15R2 towards the read head 15R1 from a position that is deviated in a direction from the read head 15R1 towards the read head 15R2 in the radial direction, along the read direction.

Furthermore, in FIG. 7 and FIG. 8, a case is described in which the reference read head is positioned on a particular track in the inner circumference region IR, but even in a case where the reference read head is positioned in the intermediate circumferential region MR or the outer circumference region OR, the MPU 60 is capable of correcting the position of the head 15, for example, the reference read head, based on the size of the read signals of the plurality of read heads, according to the same processing as that of a case where the reference read head 15R1 is positioned on a particular track in the inner circumference region IR.

Figure 9:
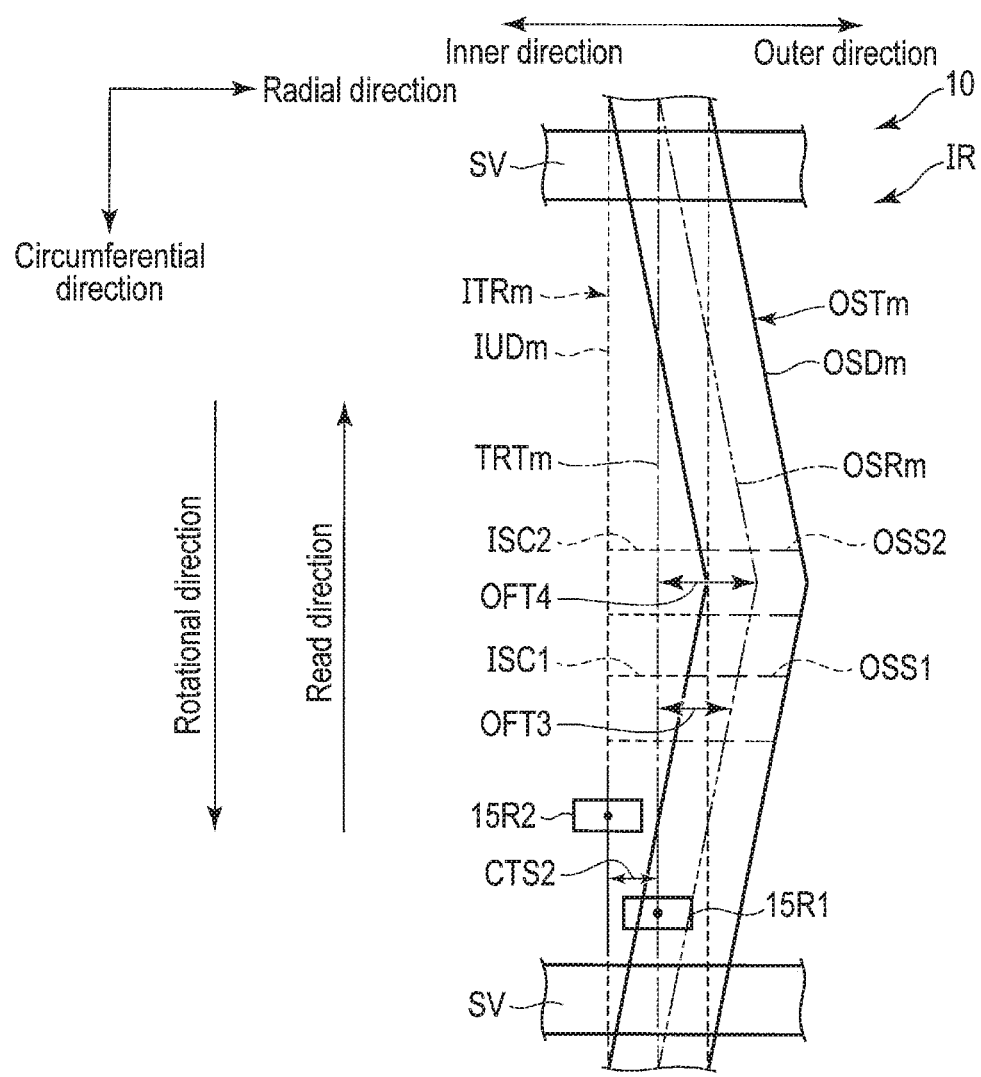
FIG. 9 is a schematic view illustrating an example of the read processing according to the first embodiment.

FIG. 9 is a schematic view illustrating an example of the read processing according, to the present embodiment. FIG. 9 illustrates an actual track OSTm that is written on the disk 10 by the write head 15W along an actual path OSRm by positioning the read head 15R1 in the target position in the inner circumference region IR. The actual path OSRm corresponds to the track center of the actual track OSTm. FIG. 9 illustrates user data OSDm of the actual track OSTm that is positioned between two continuous servo sectors SV. The actual track OSTm is deviated with respect to the target track ITRm in the outer direction. The read head 15R2 is separated from the read head 15R1 in the inner direction at the cross track separation CTS2. FIG. 9 illustrates the sector ISC1 of the target track ITRm, and the sector ISC2 of the target track ITRm that is positioned in the read direction with respect to the sector ISC1. FIG. 9 illustrates a sector OSS1 of the actual track OSTm, and a sector OSS2 of the actual track OSTm that is positioned in the read direction from the sector OSS1. The sector OSS1 corresponds to a sector in which the sector ISC1 is deviated in the outer direction by an off-track amount OFT3. The sector OSS2 corresponds to a sector in which the sector ISC2 is deviated in the outer direction by an off-track amount OFT4. The sector OSS2 is a sector that is most deviated in the radial direction with respect to the user data IUDm, in the user data OSDm.

In the example illustrated in FIG. 9, when the target track ITRm is written on the disk 10 by the write head 15W along the target path TRTm, in the inner circumference region IR, the write head 15W is deviated in the outer direction according to the non-linearity, the mechanical properties, or the like of the servo processing due to the vibration or the like from the outside, and thus, the MPG 60 writes the actual track OSTm along the actual path OSRm that is deviated from the target path TRTm in the outer direction.

In the example illustrated in FIG. 9, the MPU 60 positions the read head 15R1 on the target track ITRm, tracks the target path TRTm by the read head 15R1, and reads the user data OSDm of the actual track OSTm by the read heads 15R1 and 15R2. The MPU 60 corrects the radial position of the read head 15R1 with each of the circumferential positions in the read direction to track the actual path OSRm, based on the read signal in which the user data OSDm is read by the read head 15R1, and the read signal in which the user data OSDm is read by the read head 15R2. In other words, the MPU 60 corrects the radial position of the read head 15R1 with each of the circumferential positions in the read direction such that the SN ratio of the read signal in which the user data OSDm is read by the read head 15R1 increases, based on the read signal in which the user data OSDm is read by the read head 15R1, and the read signal in which the user data OSDm is read by the read head 15R2. For example, the MPU 60 shifts the radial position of the read head 15R1 in the outer direction to read the sector OSS1 and the sector OSS2, based on the read signal in which the user data OSDm is read by the read head 15R1, and the read signal in which the user data OSDm is read by the read head 15R2. In other words, the MPU 60 shifts the radial position of the read head 15R1 in a direction from the read head 15R2 towards the read head 15R1 to read the sector OSS1 and the sector OSS2, based on the read signal in which the user data OSDm is read by the read head 15R1, and the read signal in which the user data OSDm is read by the read head 15R2.

FIG. 10 is a diagram illustrating an example of a circumferential change in the size of the read signal in which the user data OSDm illustrated in FIG. 9 is read by each of the plurality of read heads 15R1 and 15R2. In FIG. 10, a horizontal axis represents the circumferential position of the user data OSDm illustrated in FIG. 9, and a vertical axis represents the size of the read signal in which the user data OSDm is read by the read heads 15R1 and 15R2. On the horizontal axis of FIG. 10, the circumferential position proceeds in the read direction as proceeding in a direction of an arrow of the circumferential position. On the vertical axis of FIG. 10, the size of the read signal increases as proceeding in a direction of a large arrow, and decreases as proceeding in a direction of a small arrow. FIG. 10 illustrates a change L12 in the size of the read signal with respect to the circumferential position in a case where the target path TRTm is tracked by the read head 15R1, and a change L22 in the size of the read signal with respect to the circumferential position in a case where the user data OSDm is read by the read head 15R1, and a the target path TRTm is tracked by the read head 15R1, and the user data OSDm is read by the read head 15R2. The change L12 in the size of the read signal decreases towards the circumferential position (hereinafter, simply referred to as a sector OSS2) corresponding to the sector OSS2 in the read direction, and increases towards the read direction from the sector OSS2. The change L22 in the size of the read signal decreases towards the sector OSS2 in the read direction, and increases towards the read direction from the sector OSS2. The change L12 in the size of the read signal of FIG. 10 represents a size SM15 of a read signal in a circumferential position CP15, a size SM16 of a read signal in a circumferential position CP16, a size SM17 of a read signal in a circumferential position CP17, and a size SM18 of a read signal in a circumferential position CP18. The circumferential position CP16 is a position in the read direction from the circumferential position CP15 and in a direction opposite to the read direction from the sector OSS2. The circumferential position CP17 is a position in the read direction from the sector OSS2 and a direction opposite to the read direction from the circumferential position CP18. The size SM15 of the read signal is larger than the size SM16 of the read signal. The size SM17 of the read signal may be larger than or equal to the size SM16 of the read signal, or may be smaller than the size SM16 of the read signal. The size SM18 of the read signal is larger than the size SM17 of the read signal. The change L22 in the size of the read signal of FIG. 10 represents a size SM25 of a read signal in a circumferential position CP25, a size SM26 of a read signal in a circumferential position CP26, a size SM27 of a read signal in a circumferential position CP27, and a size SM28 of a read signal in a circumferential position CP28. The circumferential position CP26 is a position in the read direction from the circumferential position CP25 and in a direction opposite to the read direction from the sector OSS2. The circumferential position CP27 is a position in the read direction from the sector OSS2 and in a direction opposite to the read direction from the circumferential position CP28. The size SM25 of the read signal is larger than the size SM26 of the read signal. The size SM27 of the read signal may be larger than or equal to the size SM26 the read signal, or may be smaller than the size SM26 of the read signal. The size SM28 of the read signal is larger than the size SM27 of the read signal. Furthermore, the circumferential positions CP15 and CP25 may be coincident with each other, or the circumferential positions CP16 and CP26 may be coincident with each other. In addition, the circumferential positions CP17 and CP27 may be coincident with each other, or the circumferential positions CP18 and CP28 may be coincident with each other.

In the example illustrated in FIG. 10, the MPU 60 reads the user data OSDm of the actual track OSTm by the read heads 15R1 and 15R2, as illustrated in FIG. 9. The MPG 60 performs Fourier transformation with respect to the user data OSDm that is read by the read head 15R1, and detects the size of the read signal in which the user data OSDm is read by the read head 15R1. For example, the MPG 60 detects that the size of the read signal of the read head 15R1 decreases as proceeding in the read direction from the size SM15 of the read signal in which the user data ISDm corresponding to the circumferential position CP15 is read by the read head 15R1, and the size SM16 of the read signal in which the user data OSDm corresponding to the circumferential position CP16 is read by the read head 15R1. The MPG 60 detects that the size of the read signal of the read head 15R2 decreases as proceeding in the read direction from the size SM25 of the read signal in which the user data OSDm corresponding to the circumferential position CP25 is read by the read head 15R2, and the size SM26 of the read signal in which the user data OSDm corresponding to the circumferential position CP26 is read by the read head 15R2. The MPG 60 determines that the user data OSDm is in a direction separated from the user data IUDm in the outer direction as illustrated in FIG. 9, from the fact that the size of the read signal of the read head 15R1 decreases, and the size of the read signal of the read head 15R2 decreases. In a case where it is determined that the user data ISDm is in the direction separated from the user data IUDm in the outer direction, the MPU 60 shifts and corrects the read head 15R1 in the outer direction. In other words, in a case where it is detected that the size of the read signal of the read head 15R1 decreases, and the size of the read signal of the read head 15R2 decreases, the MPU 60 corrects the read head 15R1 to be gradually deviated in a direction from the read head 15R2 towards the read head 15R1 in the radial direction along the read direction.

For example, the MPU 60 detects that the size of the read signal of the read head 15R1 increases as proceeding in the read direction from the size SM17 of the read signal in which the user data OSDm corresponding to the circumferential position CP17 is read by the read head 15R1, and the size SM18 of the read signal in which the user data OSDm corresponding to the circumferential position C218 is read by the read head 15R1. The MPU 60 detects that the size of the read signal of the read head 15R2 increases as proceeding in the read direction from the size SM27 of the read signal in which the user data OSDm corresponding to the circumferential position CP27 is read by the read head 15R2, and the size SM28 of the read signal in which the user data OSDm corresponding to the circumferential position CP28 is read by the read head 15R2. The MPU 60 determines that the user data OSDm is in the inner direction from a position that is separated from the user data IUDm in the outer direction, as illustrated in FIG. 9, from the fact that the size of the read signal of the read head 15R1 increases, and the size of the read signal of the read head 15R2 increases. In a case where it is determined that the user data OSDm is in the inner direction from the position that is separated from the user data IUDm in the outer direction, the MPU 60 corrects the read head 15R1 to be in the inner direction from a position that is deviated in the outer direction. In other words, in a case where it is detected that the size of the read signal of the read head 15R1 increases, and the size of the read signal of the read head 15R2 increases, the MPU 60 corrects the read head 15R1 to be gradually deviated in a direction from the read head 15R1 towards the read head 15R2 in the radial direction from a position that is deviated in a direction from the read head 15R2 towards the read head 15R1 in the radial direction, along the read direction.

Furthermore, in FIG. 9 and FIG. 10, a case is described in which the reference read head is positioned on a particular track in the inner circumference region IR, but even in a case where the reference read head is positioned in the intermediate circumferential region MR or the outer circumference region OR, the MPU 60 is capable of correcting the position of the head 15, for example, the reference read head, based on the size of the read signals of the plurality of read heads, according to the same processing as that of a case where the reference read head 15R1 is positioned on a particular track in the inner circumference region IR.

Figure 11:
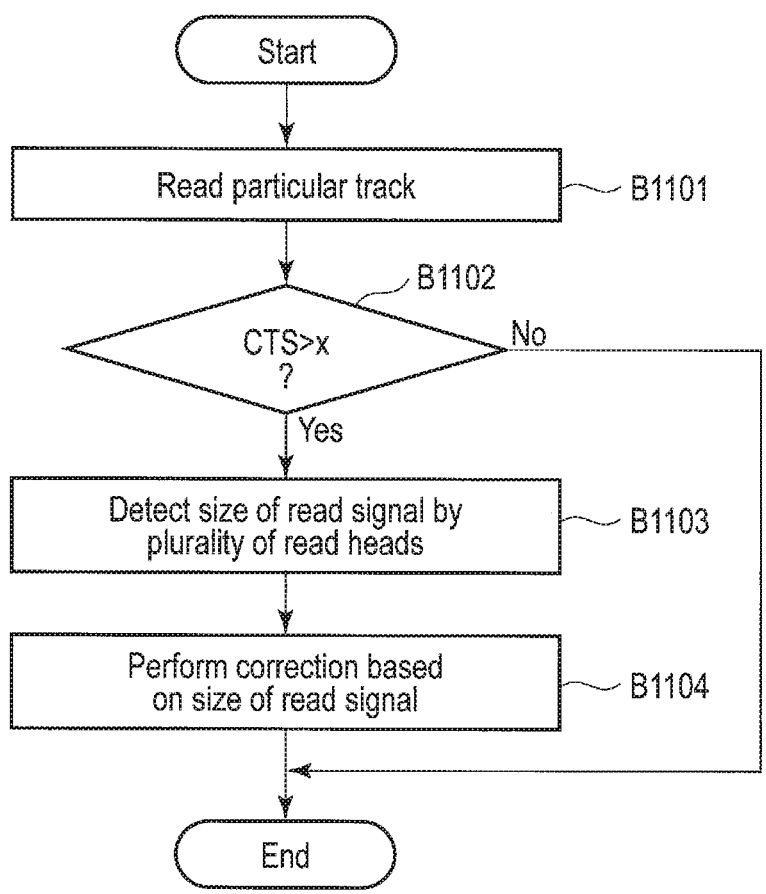
FIG. 11 is a flowchart illustrating an example of the read processing according to the first embodiment.

FIG. 11 is a flowchart illustrating an example of the read processing according to the present embodiment.

The MPG 60 positions the reference read head on a particular track, and reads the particular track by the plurality of read heads (B1101). For example, the MPU 60 positions the read head 15R1 on a particular track, and reads the particular track by the read heads 15R1 and 15R2. The MPG 60 determines whether the cross track separation is greater than a particular value (x) or is less than or equal to the particular value (x) (B1102). For example, the MPU 60 determines whether the cross track separation is greater than a value corresponding to separation of 10% of the maximum value (hereinafter, simply referred to as a value of 10%) or is less than or equal to the value of 10%. In a case where it is determined that the cross track separation is less than or equal to the particular value (x) (NO of B1102), the MPU 60 ends the processing in a case where it is determined that the cross track separation is greater than the particular value (x) (YES of B1102), the MPU 60 detects the size of the plurality of read signals in which a particular track is read by each of the plurality of read heads (B1103). For example, the MPU 60 detects the size of the read signal that is acquired by performing Fourier transformation with respect to the read signal in which the user data of a particular track is read by the read head 15R1, and the size of the read signal that is obtained by performing Fourier transformation with respect to the read signal in which the user data is read by the read head 15R2 that is separated from the read head 15R1 in the radial direction at particular cross track separation. The MPU 60 corrects the position of the head 15, based on the size of the plurality of read signals in which the user data of a particular track is read by the plurality of read heads (B1104), and ends the processing. For example, the MPU 60 corrects the reference read head, for example, the read head 15R1, based on the size of the read signal of the read head 15R1, and the size of the read signal of the read head 15R2 that is separated from the read head 15R1 in the radial direction at particular cross track separation, and ends the processing.

In an example, in a case where it is detected that that the read signal of the read head 15R1 that is the reference read head decreases, and the read signal of the read head 15R2 increases in the inner direction at particular cross track separation with respect to the read head 15R1 when a particular track is read by the read head 15R1, and the read head 15R2 that is separated from the read head 15R1 in the radial direction at particular cross track separation, the MPU 60 shifts the read head 15R1 in the inner direction, and ends the processing.

In another example, in a case where it is detected that the read signal of the read head 15R1 that is the reference read head decreases, and the read signal of the read head 15R2 decreases in the inner direction at particular cross track separation with respect to the read head 15R1 when a particular track is read by the read head 15R1, and the read head 15R2 that is separated from the read head 15R1 in the radial direction at particular cross track separation, the MPU 60 shifts the read head 15R1 in the outer direction, and ends the processing.

According to the present embodiment, the magnetic disk drive 1 includes the plurality of read heads. The magnetic disk drive 1 positions the reference read head in the plurality of read heads on a particular track, and reads the track by the plurality of read heads. The magnetic disk drive 1 determines whether the cross track separation is 0 or not 0. In a case where it is determined that the cross track separation is not 0, the magnetic disk drive 1 detects the size or the plurality of read signals in which the user data of a particular track is read by each of the plurality of read heads. The magnetic disk drive 1 corrects the position of the head 15, based on the size of the plurality of read signals in which the user data of a particular track is read by the plurality of read heads. For this reason, the magnetic disk drive 1 is capable of improving the accuracy of the read processing.

Next, magnetic disk drives according to other embodiments or modification examples of the other embodiments will be described. In the other embodiments or the modification examples of the other embodiments, the same reference symbols will be applied to the same portions as those of the embodiment described above, and the detailed description thereof will be omitted.

Second Embodiment

A magnetic disk drive 1 of a second embodiment is different from the magnetic disk drive 1 of the first embodiment in the configuration of the read system.

FIG. 12 is a block diagram illustrating a configuration example of a read system according to the second embodiment.

A system controller 130 includes a signal processing circuit, for example, an automatic gain control (AGC) circuit AG1, a signal processing circuit, for example, an AGC circuit AG2, and an MPU 60, as a read system. For example, the AGC circuit AG1 controls a gain of data for each partition W that is acquired from a buffer 801, and outputs the data of which the gain is controlled to the MPU 60. For example, the AGC circuit AG2 controls a gain of data for each of the partitions W that is acquired from a buffer 802, and outputs the data of which the gain is controlled to the MPU 60.

For example, a correction unit 602 detects the amplitude of a plurality of read signals in which user data of a particular track is read by each of read heads 15R1 and 15R2 from data that is input from the AGC circuits AG1 and AG2. The correction unit 602 corrects the position of the reference read head, for example, the read head 15R1 to track the track center of the track, based on the amplitude of the read signal in which the user data of the particular track is read by the read head 15R1, and the amplitude of the read signal in which the user data of the particular track is read by the read head 15R2 that is separated from the read head 15R1 in the radial direction at particular cross track separation.

In an example, the correction unit 602 corrects the position of the read head 15R1 such that the amplitude of the read signal in which the user data is read by the read head 15R1 is a desired value, based on the amplitude of the read signal in which the user data of a particular track is read by the read head 15R1, and the amplitude of the read signal in which the user data of the particular track is read by the read head 15R2 that is separated from the read head 15R1 in the inner direction at cross track separation CTS. For example, the correction unit 602 corrects the position of the read head 15R1 such that the amplitude of the read signal in which the user data is read by the read head 15R1 increases, based on the size of the read signal in which the user data of a particular track is read by the read head 15R1, and the size of the read signal in which the user data of the particular track is read by the read head 15R2 that is separated from the read head 15R1 in the inner direction at the cross track separation CTSx.

In other words, the correction unit 602 corrects the position of the read head 15R1 such that the SN ratio of the read signal in which the user data is read by the reference read head, for example, the read head 15R1 is a desired value, based on the amplitude of the read signal in which the user data of a particular track is read by the read head 15R1, and the amplitude of the read signal in which the user data of the particular track is read by the read head 15R2 that is separated from the read head 15R1 in the inner direction at the cross track separation CTSx. For example, the correction unit 602 corrects the position of the read head 15R1 such that the SN ratio of the read signal in which the user data is read by the read head 15R1 increases, based on the amplitude of the read signal in which the user data of a particular track is read by the read head 15R1, and the amplitude of the read signal in which the user data of the particular track is read by the read head 15R2 that is separated from the read head 15R1 in the inner direction at the cross track separation CTSx. The SN ratio of the read signal corresponds to the amplitude of the read signal. For example, in a case where the SN ratio of the read signal increases, the amplitude of the read signal also increases. In addition, in a case where the SN ratio of the read signal decreases, the amplitude of the read signal also decreases.

FIG. 13 is a flowchart illustrating an example of read processing according to the second embodiment. The MPG 60 positions the reference read head on a particular track, reads the particular track by the plurality of read heads (B1101), and determines whether the cross track separation is greater than a particular value (x) or is less than or equal to the particular value (x) (B1102). In a case where it is determined that the cross track separation is less than or equal to the particular value (x) (NO of B1102), the MPG 60 ends the processing. In a case where it is determined that the cross track separation is greater than the particular value (x) (YES of B1102), the MPU 60 detects the amplitude of the plurality of read signals in which a particular track is read by each of the plurality of read heads (B1301). For example, the MPG 60 detects the amplitude of the read signal in which the user data of a particular track is read by the read head 15R1, and the amplitude of the read signal in which the user data is read by the read head 15R2 that is separated from the read head 15R1 in the radial direction at particular cross track separation. The MPU 60 corrects the position of the head 15, based on the amplitude of the plurality of read signals in which the user data of a particular track is read by the plurality of read heads (B1302), and ends the processing. For example, the MPU 60 corrects the position of the reference read head, for example, the read head 15R1, based on the amplitude of the read signal of the read head 15R1, and the amplitude of the read signal of the read head 15R2 that is separated from the read head 15R1 in the radial direction at particular cross track separation, and ends the processing.

According to the second embodiment, the magnetic disk drive 1 includes the plurality of read heads. The magnetic disk drive 1 positions the reference read head in the plurality of read heads on a particular track, and reads the track by the plurality of read heads. The magnetic disk drive 1 detects the amplitude of the plurality of read signals in which the user data of a particular track is read by each of the plurality of read heads. The magnetic disk drive 1 corrects the position of the head 15, based on the amplitude of the plurality of read signals in which the user data of a particular track is read by the plurality of read heads. For this reason, the magnetic disk drive 1 is capable of improving the accuracy of the read processing.

Third Embodiment

A magnetic disk drive 1 of a third embodiment is different from the magnetic disk drive 1 of the first embodiment and the second embodiment described above in the configuration of the head 15.

FIG. 14 is a schematic view illustrating an example of read processing according to the third embodiment. In FIG. 14, a width RWD1 of a read head 15R1 in the radial direction (hereinafter, simply referred to as a width) is a width in which an actual track ISTm can be read by positioning the read head 15R1 on a target track ITRm. The width RWD1 of the read head 15R1 is larger than a width RWD2 of a read head 15R2. For example, the width RWD1 of the read head 15R2 corresponds to twice the width RWD2 of the read head 15R2. In addition, the width RWD1 of the read head 15R1 is identical to a width WWD of a write head 15W.

In the example illustrated in FIG. 14, an MPU 60 positions the read head 15R1 on the target track ITRm, tracks a target path TRTm by the read head 15R1, and reads user data ISDm of the actual track ISTm by the read heads 15R1 and 15R2. The MPU 60 corrects the radial position of the read head 15R1 with each of the circumferential positions in the read direction to track an actual path ISRm, based on the read signal in which the user data ISDm is read by the read head 15R1, and the read signal in which the user data ISDm is read by the read head 15R2.

Figure 15:
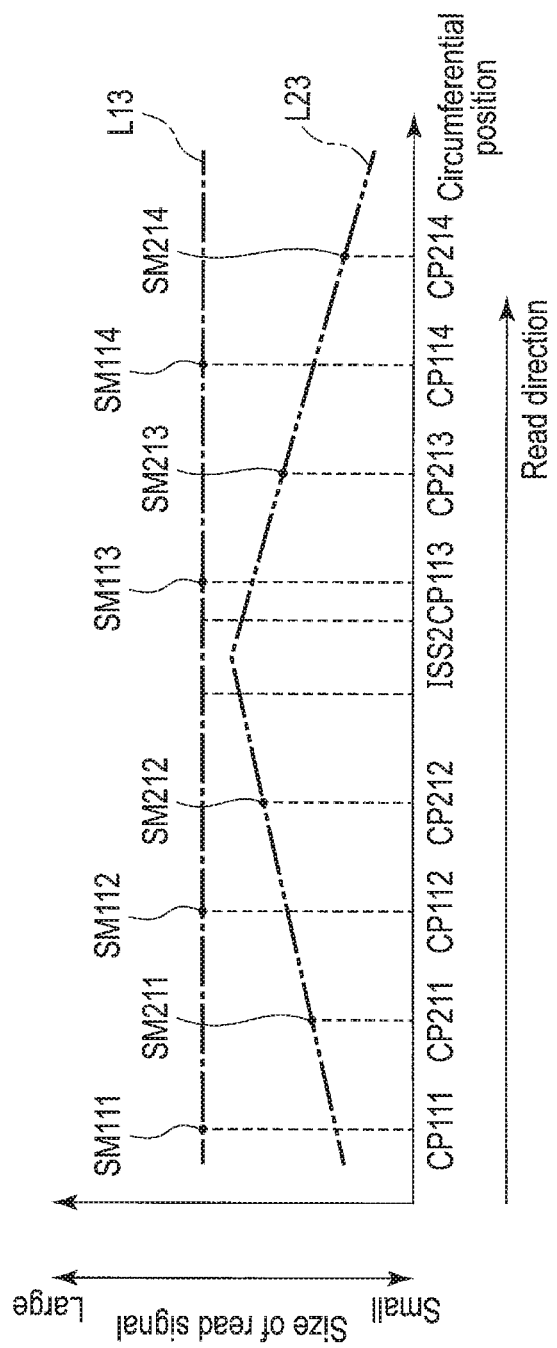
FIG. 15 is a diagram illustrating an example of a circumferential change in a size of a read signal in which user data illustrated in FIG. 14 is read by each of the plurality of read heads.

FIG. 15 is a diagram illustrating an example of a circumferential change in the size of the read signal in which the user data ISDm illustrated FIG. 14 read by each of the plurality of read heads 15R1 and 15R2. In FIG. 15, a horizontal axis represents the circumferential position of the user data ISDm illustrated in FIG. 14, and a vertical axis represents the size of the read signal in which the user data ISDm is read by the read heads 15R1 and 15R2. On the horizontal axis of FIG. 15, the circumferential position proceeds in the read direction as proceeding in a direction of an arrow of the circumferential position. On the vertical axis of FIG. 15, the size of the read signal increases as proceeding in a direction of a large arrow, and decreases as proceeding in a direction of a small arrow. FIG. 15 illustrates a change L13 in the size of the read signal with respect to the circumferential position in a case where the target path TRTm is tracked by the read head 15R1, and the user data ISDm is read by the read head 15R1, and a change L23 in the size of the read signal with respect to the circumferential position in a case where the target path TRTm is tracked by the read head 15R1, and the user data ISM is read by the read head 15R2. The change L13 in the size of the read signal is constant in the read direction. The change L23 in the size of the read signal increases towards the sector ISS2, and decreases in the read direction from the sector ISS2. The change L13 in the size of the read signal of FIG. 15 represents a size SM111 of a read signal in a circumferential position CP111, a size SM112 of a read signal in a circumferential position CP112, a size SM113 of a read signal in a circumferential position CP113, and a size SM114 of a read signal in a circumferential position CP114. The circumferential position CP112 is a position in the read direction from the circumferential position CP111 and in a direction opposite to the read direction from the sector ISS2 The circumferential position CP113 is a position in the read direction from the sector ISS2 and in a direction opposite to the read direction from the circumferential position CP114. The sizes SM111, SM112, SM113, and SM114 of the read signal are the same. Furthermore, the sizes SM111, SM112, SM113, and SM114 of the read signal may be slightly different from each other. The change L23 in the size of the read signal of FIG. 15 represents a size SM211 of a read signal in a circumferential position CP211, a size SM212 of a read signal in a circumferential position CP212, a size SM213 of a read signal in a circumferential position CP213, and a size SM214 of a read signal in a circumferential position CP214. The circumferential position CP212 is a position in the read direction from the circumferential position CP211 and in a direction opposite to the read direction from the sector ISS2. The circumferential position CP213 is a position in the read direction from the sector ISS2 and in a direction opposite to the read direction from the circumferential position CP214. The size SM212 of the read signal is larger than the size SM211 of the read signal. The size SM213 of the read signal may be larger than or equal to the size SM212 of the read signal, or may be smaller than the size SM212 of the read signal. The size SM213 of the read signal is larger than the size SM214 of the read signal. Furthermore, the circumferential positions CP111 and CP211 may be coincident with each other, or the circumferential positions CP112 and CP212 may be coincident with each other. In addition, the circumferential positions CP113 and CP213 may be coincident with each other, or the circumferential positions CP114 and CP214 may be coincident with each other.

In the example illustrated in FIG. 15, the MPU 60 reads the user data ISDm of the actual track ISTm by the read heads 15R1 and 15R2, as illustrated in FIG. 14. The MPU 60 performs Fourier transformation with respect to the user data ISDm that is read by the read head 15R1, and detects the size of the read signal in which the user data ISDm is read by the read head 15R1. For example, the MPU 60 detects that the size of the read signal of the read head 15R1 is constant in the read direction from the size SM111 of the read signal in which the user data ISDm corresponding to the circumferential position CP111 is read by the read head 15R1, and the size SM112 of the read signal in which the user data ISDm corresponding to the circumferential position CP112 is read by the read head 15R1. The MPU 60 detects that the size of the read signal of the read head 15R2 increases as proceeding in the read direction from the size SM211 of the read signal in which the user data ISDm corresponding to the circumferential position CP211 is read by the read head 15R2, and the size SM212 of the read signal in which the user data ISDm corresponding to the circumferential position CP212 is read by the read head 15R2. The MPU 60 determines that the user data ISDm is in a direction that is separated from the user data IUDm in the inner direction, as illustrated in FIG. 14, from the fact that the size of the read signal of the read head 15R1 is constant, and the size of the read signal of the read head 15R2 increases. In a case where it is determined that the user data ISDm is in the direction that is separated from the user data IUDm in the inner direction, the MPU 60 shifts and corrects the read head 15R1 in the inner direction. In other words, in a case where it detected that the size of the read signal of the read head 15R2 increases without changing the size of the read signal of the read head 15R1 when the read head 15R2 is positioned in the inner direction at the cross track separation from the read head 15R1, the MPU 60 corrects the read head 15R1 to be gradually deviated in a direction from the read head 15R1 towards the read head 15R2 in the radial direction along the read direction.

For example, the MPU 60 detects that the size of the read signal of the read head 15R1 is constant in the read direction from the size SM113 of the read signal in which the user data ISDm corresponding to the circumferential position CP113 is read by the read head 15R1, and the size SM114 of the read signal in which the user data ISDm corresponding to the circumferential position CP114 is read by the read head 15R1. The MPU 60 detects that the size of the read signal of the read head 15R2 decreases as proceeding an the read direction from the size SM213 of the read signal in which the user data ISDm corresponding to the circumferential position CP213 is read by the read head 15R2, and the size SM214 of the read signal in which the user data ISDm corresponding to the circumferential position CP214 is read by the read head 15R2. The MPU 60 determines that the user data ISDm is in the outer direction from a position that is separated from the user data IUDm in the inner direction, as illustrated in FIG. 14, from the fact that the size of the read signal of the read head 15R1 is constant, and the size of the read signal of the read head 15R2 decreases. In a case where it is determined that the user data ISDm is in the outer direction from the position that is separated from the user data IUDm in the inner direction, the MPU 60 corrects the read head 15R1 in the outer direction from a position that is deviated in the inner direction. In other words, in a case where it is detected that the size of the read signal of the read head 15R2 decreases without changing the size of the read signal of the read head 15R1 when the read head 15R2 is positioned in the inner direction at the cross track separation from the read head 15R1, the MPU 60 corrects the read head 15R1 to be gradually deviated in a direction from the read head 15R2 towards the read head 15R1 from a position that is deviated from a direction from the read head 15R1 towards the read head 15R2 in the radial direction, along the read direction.

According to the third embodiment, the magnetic disk drive 1 includes the plurality of read heads. The width of the reference read head in the plurality of read heads is larger than the width of the plurality of read heads other than the reference head. The magnetic disk drive 1 positions the reference read head on a particular track, and reads the track by the plurality of read heads. The magnetic disk drive 1 detects the size of the plurality of signal in which the user data of a particular track is read by each of the plurality of read heads. The magnetic disk drive 1 corrects the position of the head 15, based on the size of the plurality of read signals in which the user data of a particular track is read by the plurality of read heads. For this reason, the magnetic disk drive 1 is capable of improving the accuracy of the read processing.

Modification Example 1

A magnetic disk drive 1 of Modification Example 1 according to the third embodiment is different from the magnetic disk drive 1 of the third embodiment described above in the configuration of the head 15.

Figure 16:
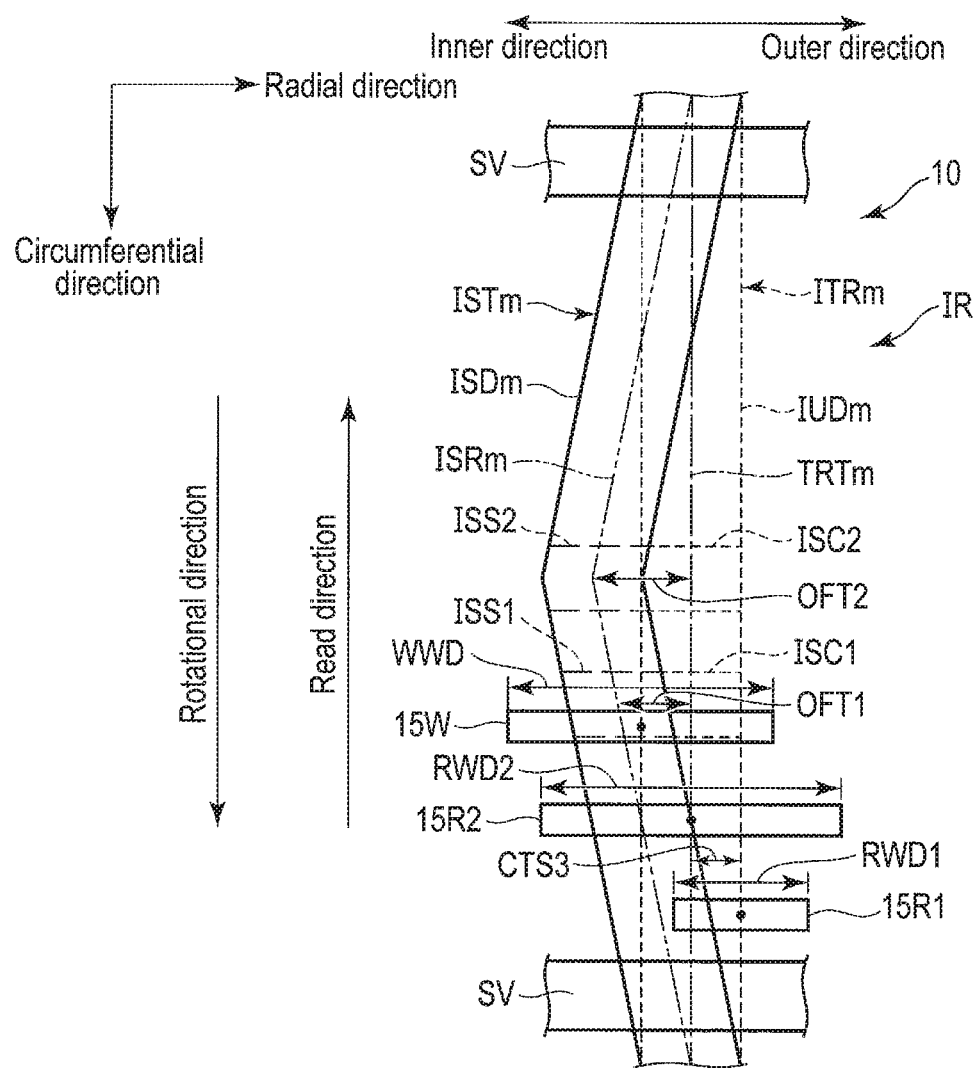
FIG. 16 is a schematic view illustrating an example of the read processing according to the third embodiment.

FIG. 16 is a schematic view illustrating an example of the read processing according to the third embodiment. In FIG. 16, a read head 15R2 is illustrated as the reference read head. A read head 15R1 is separated from the read head 15R2 in the outer direction at cross track separation CTS3. A width RWD2 of the read head 15B2 is a width in which an actual track ISTm can be read by positioning the read head 15R2 on a target track ITRm. A width RWD2 of the read head 15R2 is larger than the width RWD1 of the read head 15R1. For example, the width RWD2 of the read head 15R2 corresponds to twice the width RWD1 of the read head 15R1. In addition, the width RWD2 of the read head 15R2 is identical to a width WWD of a write head 15W.

In the example illustrated in FIG. 16, an MPU 60 positions the read head 15R2 on the target track ITRm, tracks a target path TRTm by the read head 15R2, and reads the user data ISDm of the actual track ISTm by the read heads 15R1 and 15R2. The MPU 60 corrects the radial positron of the read head 15R2 with each of the circumferential positions in the read direction to track the actual path ISRm, based on the read signal in which the user data ISDm is read by the read head 15R1, and the read signal in which the user data ISDm is read by the read head 15R2.

Figure 17:
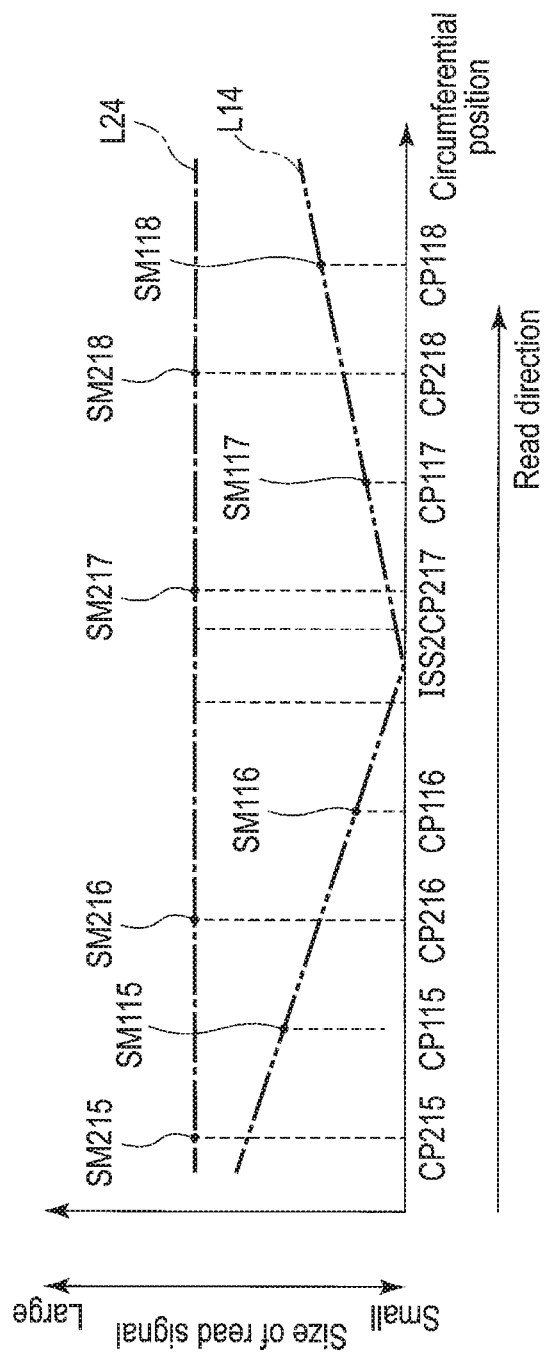
FIG. 17 is a diagram illustrating an example of a circumferential change in a size of a read signal in which user data illustrated in FIG. 16 is read by each of the plurality of read heads.

FIG. 17 is a diagram illustrating an example of a circumferential change in the size of the read signal in which the user data ISDm illustrated in FIG. 16 is read by each of the plurality of read heads 15R1 and 15R2. In FIG. 17, a horizontal axis represents the circumferential position of the user data ISDm illustrated in FIG. 16, and a vertical axis represents the size of the read signal in which the user data ISDm is read by the read heads 15R1 and 15R2. On the horizontal axis of FIG. 17, the circumferential position proceeds in the read direction as proceeding in a direction of an arrow of the circumferential position. On the vertical axis of FIG. 17, the size of the read signal increases as proceeding in a direction of a large arrow, and decreases as proceeding in a direction of a small arrow. FIG. 17 illustrates a change L14 in the size of the read signal with respect to the circumferential position in a case where the target path TRTm is tracked by the read head 15R2, and the user data ISDm is read by the read head 15R1, a change L24 in the size of the read signal with respect to the circumferential position in a case where the target path TRTm is tracked by the read head 15R2, and the user data ISDm is read by the read head 15R2. The change L14 in the size of the read signal decreases towards a sector ISS2, and increases in the read direction from the sector ISS2. The change L24 in the size of the read signal is constant in the read direction. The change L14 in the size of the read signal of FIG. 17 represents a size SM115 of a read signal in a circumferential position CP115, a size SM116 of a read signal in a circumferential position CP116, a size SM117 of a read signal in a circumferential position CP117, and a size SM118 of a read signal in a circumferential position CP118. The circumferential position CP116 is a position in the read direction from the circumferential position CP115 in a direction opposite to the read direction from the sector ISS2. The circumferential position CP117 is a position in the read direction from the sector ISS2 and in a direction opposite to the read direction from the circumferential position CP118. The size SM116 of the read signal is larger than the size SM115 of the read signal. The size SM117 of the read signal may be larger than or equal to the size SM116 of the read signal, or may be smaller than the size SM116 of the read signal. The size SM117 of the read signal is smaller than the size SM118 of the read signal. The change L24 in the size of the read signal of FIG. 17 represents a size SM215 of a read signal in a circumferential position CP215, a size SM216 of a read signal in a circumferential position CP216, a size SM217 of a read signal in a circumferential position CP217, and a size SM218 of a read signal in a circumferential position CP218. The circumferential position CP216 is a position in the read direction from the circumferential position CP215 and in a direction opposite to the read direction from the sector ISS2. The circumferential position CP217 is a position in the read direction from the sector 15R2 and in a direction opposite to the read direction from the circumferential position CP218. The sizes SM215, SM216, SM217, and SM218 of the read signal are the same. Furthermore, the sizes SM215, SM216, SM217, and SM218 of the read signal may be slightly different from each other. Furthermore, the circumferential positions CP115 and CP215 may be coincident with each other, or the circumferential positions CP116 and CP216 may be coincident with each other. In addition, the circumferential positions CP117 and CP217 may be coincident with each other, or the circumferential positions CP118 and CP218 may be coincident with each other.

In the example illustrated in FIG. 17, the MPU 60 reads the user data ISDm of the actual track ISTm by the read heads 15R1 and 15R2, as illustrated in FIG. 16. The MPU 60 performs Fourier transformation with respect to the user data ISDm that is read by the read head 15R1, and detects the size of the read signal in which the user data ISDm is read by the read head 15R1. For example, the MPU 60 detects that the size of the read signal of the read head 15R1 decreases as proceeding in the read direction from the size SM115 of the read signal in which the user data ISDm corresponding to the circumferential positron CP115 is read by the read head 15R1, and the size SM116 of the read signal in which the user data ISDm corresponding to the circumferential position CP116 is read by the read head 15R1. The MPG 60 detects that the size of the read signal of the read head 15R2 is constant from the size SM215 of the read signal in which the user data ISDm corresponding to the circumferential position CP215 is read by the read head 15R2, and the size SM216 of the read signal in which the user data ISDm corresponding to the circumferential position CP216 is read by the read head 15R2. The MPU 60 determines that the user data ISDm is in a direction that is separated from the user data IUDm in the inner direction, as illustrated in FIG. 16, from the fact that the size of the read signal of the read head 15R1 decreases, and the size of the read signal of the read head 15R2 is constant. In a case where it is determined that the user data ISDm is in the direction that is separated from the user data IUDm in the inner direction, the MPG 60 shifts and corrects the read head 15R2 in the inner direction. In other words, in a case where it is detected that the size of the read signal of the read head 15R1 decreases without changing the size of the read signal of the read head 15R2 when the read head 15R1 is positioned in the outer direction at the cross track separation from the read head 15R2, the MPU 60 corrects the read head 15R2 to be gradually deviated in a direction from the read head 15R1 towards the read head 15R2 in the radial direction, along the read direction.

For example, the MPU 60 detects that the size of the read signal of the read head 15R1 increases as proceeding in the read direction from the size SM117 of the read signal in which the user data ISDm corresponding to the circumferential position CP117 is read by the read head 15R1, and the size SM118 of the read signal in which the user data ISDm corresponding to the circumferential position CP118 is read by the read head 15R1. The MPU 60 detects that the size of the read signal of the read head 15R2 is constant in the read direction from the size SM217 of the read signal in which the user data ISDm corresponding to the circumferential position CP217 is read by the read head 15R2, and the size SM218 of the read signal in which the user data ISDm corresponding to the circumferential position CP218 is read by the read head 15R2. The MPU 60 determines that the user data ISDm is in the outer direction from a position that is separated from the user data IUDm in the inner direction, as illustrated in FIG. 16, from the fact that the size of the read signal of the read head 15R1 increases, and the size of the read signal of the read head 15R2 is constant. In a case where it is determined that the user data ISDm is in the outer direction from the position that is separated from the user data. IUDm in the inner direction, and the MPU 60 corrects the read head 15R2 in the outer direction from a position that is deviated in the inner direction. In other words, in a case where the size of the read signal of the read head 15R1 increases without changing the size of the read signal of the read head 15R2 when the read head 15R1 is positioned in the outer direction at the cross track separation from the read head 15R2, the MPU 60 corrects the read head 15R2 to be gradually deviated in a direction from the read head 15R2 towards the read head 15R1 from a position that is deviated in a direction from the read head 15R1 towards the read head 15R2 in the radial direction, along the read direction.

According to Modification Example 1 of the third embodiment, the magnetic disk drive 1 includes the plurality of read heads. The width of the reference read head in the plurality of read heads is larger than the width of the plurality of read heads other than the reference head. The magnetic disk drive 1 positions the reference read head on a particular track, and reads the track by the plurality of read heads. The magnetic disk drive 1 detects the size of the plurality of signals in which the user data of a particular track is read by each of the plurality of read heads. The magnetic disk drive 1 corrects the position of the head 15, based on the size of the plurality of read signals in which the user data of a particular track is read by the plurality of read heads. For this reason, the magnetic disk drive 1 is capable of improving the accuracy of the read processing.

While certain embodiments have been described, these embodiment have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive, comprising:
a disk comprising a plurality of servo data items;
a head comprising a write head which writes data to the disk, and a first read head and a second read head which read data from the disk; and
a controller configured to position the head based on a first signal in which write data positioned between the servo data items of the disk is read by the first read head, and a second signal in which the write data is read by the second read head separated from the first read head in a radial direction of the disk, wherein
the controller positions the head based on a size of the first signal and a size of the second signal, and shifts the head in a first direction from the first read head towards the second read head in the radial direction in a case where the size of the first signal decreases and the size of the second signal increases.

2. The magnetic disk drive according to claim 1, wherein the controller detects the size of the first signal by performing Fourier transformation with respect to the first signal, and detects the size of the second signal by performing Fourier transformation with respect to the second signal.

3. The magnetic disk drive according to claim 1, wherein a first width of the first read head in the radial direction is larger than a second width of the second read head in the radial direction.

4. The magnetic disk drive according to claim 3, wherein in a case where the size of the second signal decreases without changing the size of the first signal, the controller shifts the head in a second direction from the second read head towards the first read head in the radial direction.

5. The magnetic disk drive according to claim 3, wherein in a case where the size of the second signal increases without changing the size of the first signal, the controller shifts the head in a second direction from the first read head towards the second read head in the radial direction.

6. The magnetic disk drive according to claim 3, wherein the first width is identical to a width of the write head in the radial direction.

7. A read processing method applied to a magnetic disk drive which comprises a disk comprising a plurality of servo data items, and a head comprising a write head which writes data with respect to the disk, and a first read head and a second read head which read data from the disk, the method comprising:
positioning the head based on a first signal in which write data positioned between the servo data items of the disk is read by the first read head, and a second signal in which the write data is read by the second read head separated from the first read head in a radial direction of the disk;
positioning the head based on a size of the first signal and a size of the second signal; and
in a case where the size of the first signal decreases, and the size of the second signal increases, shifting the head in a first direction from the first read head towards the second read head in the radial direction.

8. The read processing method according to claim 7, further comprising:
detecting the size of the first signal by performing Fourier transformation with respect to the first signal, and detects the size of the second signal by performing Fourier transformation with respect to the second signal.

9. The read processing method according to claim 7, wherein a first width of the first read head in the radial direction is larger than a second width of the second read head in the radial direction.

10. The read processing method according to claim 9, further comprising:
in a case where the size of the second signal decreases without changing the size of the first signal, shifting the head in a second direction from the second read head towards the first read head in the radial direction.

11. The read processing method according to claim 9, further comprising:
in a case where the size of the second signal increases without changing the size of the first signal, shifting the head in a second direction from the first read head towards the second read head in the radial direction.

12. The read processing method according to claim 9, wherein the first width is identical to a width of the write head in the radial direction.

13. A magnetic disk drive, comprising:
a disk comprising a plurality of servo data items;
a head comprising a write head which writes data to the disk, and a first read head and a second read head which read data from the disk; and
a controller configured to position the head based on a first signal in which write data positioned between the servo data items of the disk is read by the first read head, and a second signal in which the write data is read by the second read head separated from the first read head in a radial direction of the disk, wherein
in a case where the size of the first signal decreases, and the size of the second signal decreases, the controller shifts the head in a second direction from the second read head towards the first read head in the radial direction.

* * * * *